(12) United States Patent
Yoneda et al.

(10) Patent No.: US 10,678,237 B2
(45) Date of Patent: Jun. 9, 2020

(54) INFORMATION PROCESSING APPARATUS, OPERATED VEHICLE, INFORMATION PROCESSING METHOD, AND RECORDING MEDIUM STORING PROGRAM

(71) Applicant: Panasonic Intellectual Property Corporation of America, Torrance, CA (US)

(72) Inventors: Takahiro Yoneda, Osaka (JP); Kazunobu Konishi, Osaka (JP); Akira Ishikawa, Nara (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/839,510

(22) Filed: Dec. 12, 2017

(65) Prior Publication Data

US 2018/0181118 A1    Jun. 28, 2018

(30) Foreign Application Priority Data

Dec. 22, 2016   (JP) .................................. 2016-250113
Sep. 8, 2017    (JP) .................................. 2017-173323

(51) Int. Cl.
  *G05D 1/00*     (2006.01)
  *B60W 30/00*    (2006.01)
  (Continued)

(52) U.S. Cl.
  CPC ........... *G05D 1/0038* (2013.01); *B60W 30/00* (2013.01); *G05D 1/0022* (2013.01);
  (Continued)

(58) Field of Classification Search
  CPC .................................................. G05D 1/0038
  See application file for complete search history.

(56) References Cited

U.S. PATENT DOCUMENTS 5,220,508 A * 6/1993 Ninomiya ............. G01S 3/7864
                                                          180/168
5,596,319 A * 1/1997 Spry .................... G05D 1/0231
                                                          180/167
(Continued)

FOREIGN PATENT DOCUMENTS

JP    2011-043884        3/2011
JP    2011176481 A  *   9/2011
WO    2009/136969 A2    11/2009

OTHER PUBLICATIONS

Extended European Search Report dated Jul. 16, 2018 for the related European Patent Application No. 17206653.2.
(Continued)

*Primary Examiner* — Alex C Dunn
(74) *Attorney, Agent, or Firm* — Greenblum & Bernstein, P.L.C.

(57) ABSTRACT

An operator uses a remote operation apparatus to remotely operate an operated vehicle. The remote operation apparatus includes a position information processor which, based on vehicle position information indicating a current position of the operated vehicle and delay information indicating a delay time required for information transmission between the operated vehicle and the remote operation apparatus, generates first position information indicating a first predicted position of the operated vehicle from the current position of the operated vehicle considering the delay time; based on obstacle position information indicating a current position of at least one obstacle around the operated vehicle acquired by the operated vehicle and the delay information, generates second position information indicating a second predicted position of the at least one obstacle from the time of the current position of the obstacle considering the delay time; and outputs the first and second position information.

11 Claims, 11 Drawing Sheets

(51) Int. Cl.
*G06T 7/70* (2017.01)
*G05D 1/02* (2020.01)
*G06K 9/00* (2006.01)

(52) U.S. Cl.
CPC ......... *G05D 1/0044* (2013.01); *G05D 1/0088* (2013.01); *G05D 1/0246* (2013.01); *G06K 9/00805* (2013.01); *G06T 7/70* (2017.01); *G05D 2201/0213* (2013.01); *G06T 2207/30261* (2013.01)

(56) References Cited

U.S. PATENT DOCUMENTS

| | | | | | |
|---|---|---|---|---|---|
| 8,543,261 | B2* | 9/2013 | Anderson | | B60W 30/09 |
| | | | | | 701/3 |
| 8,774,950 | B2* | 7/2014 | Kelly | | G05B 23/0267 |
| | | | | | 700/65 |
| 8,849,494 | B1* | 9/2014 | Herbach | | B60W 30/00 |
| | | | | | 701/24 |
| 9,008,890 | B1* | 4/2015 | Herbach | | B60W 30/00 |
| | | | | | 701/26 |
| 9,080,866 | B1* | 7/2015 | Dowdall | | G01S 17/023 |
| 2006/0167588 | A1* | 7/2006 | Kong | | G05D 1/0255 |
| | | | | | 700/245 |
| 2007/0219720 | A1* | 9/2007 | Trepagnier | | B60W 30/00 |
| | | | | | 701/300 |
| 2009/0285110 | A1* | 11/2009 | Yamasaki | | H04L 43/0811 |
| | | | | | 370/252 |
| 2010/0249957 | A1* | 9/2010 | Price | | E02F 9/205 |
| | | | | | 700/83 |
| 2012/0150426 | A1* | 6/2012 | Conway | | G08G 5/0026 |
| | | | | | 701/120 |
| 2013/0295952 | A1* | 11/2013 | Chao | | G01S 5/0236 |
| | | | | | 455/456.1 |
| 2014/0067155 | A1* | 3/2014 | Yu | | B60W 40/13 |
| | | | | | 701/1 |
| 2014/0156073 | A1* | 6/2014 | Zhang | | B25J 9/1689 |
| | | | | | 700/257 |
| 2015/0210280 | A1* | 7/2015 | Agnew | | B60W 30/09 |
| | | | | | 701/48 |
| 2015/0261218 | A1* | 9/2015 | Nakamura | | G05D 1/0038 |
| | | | | | 701/2 |
| 2015/0382232 | A1* | 12/2015 | Maekawa | | H04W 24/06 |
| | | | | | 370/230 |
| 2016/0111039 | A1* | 4/2016 | Iwami | | H04N 21/43637 |
| | | | | | 345/520 |
| 2016/0144857 | A1* | 5/2016 | Ohshima | | G05D 1/0061 |
| | | | | | 701/23 |
| 2016/0148450 | A1* | 5/2016 | Ohshima | | B60R 25/24 |
| | | | | | 340/5.61 |
| 2016/0219606 | A1* | 7/2016 | Amano | | H04N 1/00217 |
| 2017/0001642 | A1* | 1/2017 | Kumai | | B62D 15/025 |
| 2017/0008521 | A1* | 1/2017 | Braunstein | | G01C 21/32 |
| 2017/0075352 | A1* | 3/2017 | Nordbruch | | G01C 21/36 |
| 2017/0364070 | A1* | 12/2017 | Oba | | B60W 50/08 |
| 2018/0253105 | A1* | 9/2018 | Suzuki | | G01C 21/32 |

OTHER PUBLICATIONS

The Partial European Search Report (R.64 EPC) dated May 28, 2018 for the related European Patent Application No. 17206653.2.

* cited by examiner

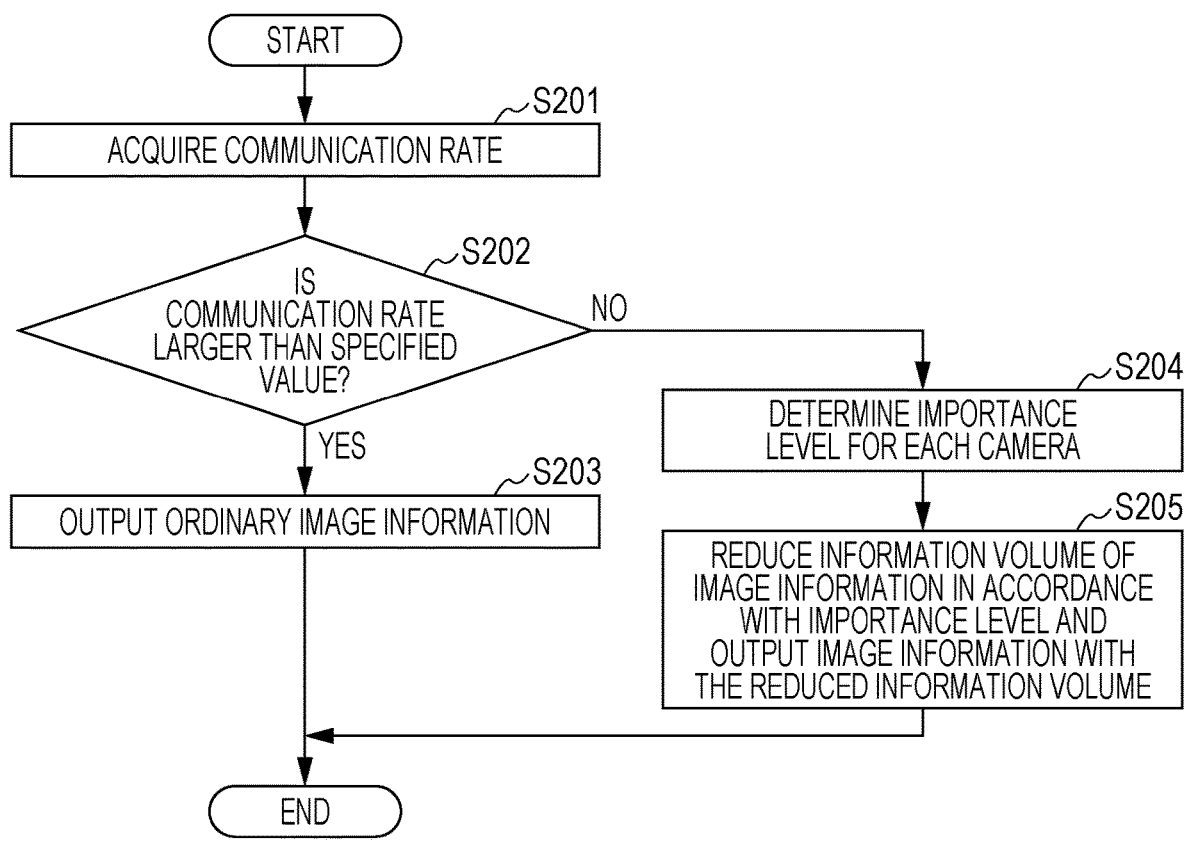

INFORMATION PROCESSING APPARATUS, OPERATED VEHICLE, INFORMATION PROCESSING METHOD, AND RECORDING MEDIUM STORING PROGRAM

BACKGROUND

1. Technical Field

The present disclosure relates to an information processing apparatus, an operated vehicle, an information processing method, and a recording medium storing a program for remotely controlling a vehicle travelling on a road.

2. Description of the Related Art

In recent years, remote operation systems have been developed in which an operator at a remote location operates a vehicle without a driver, or a vehicle in a state where a driver is on the vehicle but does not drive the vehicle, utilizing communication means such as wireless LANs (Local Area Networks) or mobile phone lines. In such remote operation systems, sensing results of an operated vehicle acquired from various sensors, such as millimeter wave radars, laser radars, and cameras, mounted on the operated vehicle are communicated to the operator via the communication means. The operator remotely operates the operated vehicle by communicating control signals on the travel of the operated vehicle to the operated vehicle.

Japanese Patent No. 5366703 discloses a remote operation system for a semi-autonomous unmanned vehicle. The remote operation system in Japanese Patent No. 5366703 includes a semi-autonomous vehicle which acquires distance measurement data within the travel range of the vehicle and performs autonomous driving based on the distance measurement data, and which is also remotely operated by an operator at a remote location using operation information transmitted from a remote operation apparatus. This remote operation system is capable of remotely operating the semi-autonomous vehicle.

SUMMARY

As for remote operation systems in which an operator at a remote location operates an operated vehicle utilizing communication means such as wireless LANs or mobile phone lines, further improvements are being required, such as improvements in safety, over conventional ones.

One non-limiting and exemplary embodiment provides an information processing apparatus, operated vehicle, information processing method, and program, which improve the safety of the operated vehicle.

In one general aspect, the techniques disclosed here feature an information processing apparatus for an operator remotely operating an operated vehicle, including: processing circuitry; and storage including at least one set of instructions that, when executed by the processing circuitry, cause the processing circuitry to perform operations including: based on vehicle position information indicating a current position of the operated vehicle acquired by the operated vehicle and delay information indicating a delay time required for information transmission between the operated vehicle and the information processing apparatus, generating first position information indicating a first predicted position of the operated vehicle from the current position of the operated vehicle considering the delay time; based on obstacle position information indicating a current position of at least one obstacle around the operated vehicle acquired by the operated vehicle and the delay information, generating second position information indicating a second predicted position of the at least one obstacle from the current position of the obstacle considering the delay time; and outputting the first position information and the second position information.

The present disclosure improves the safety of the operated vehicle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a flowchart according to Embodiment 1, illustrating processing to reduce image information;

DETAILED DESCRIPTION

Figure 1:
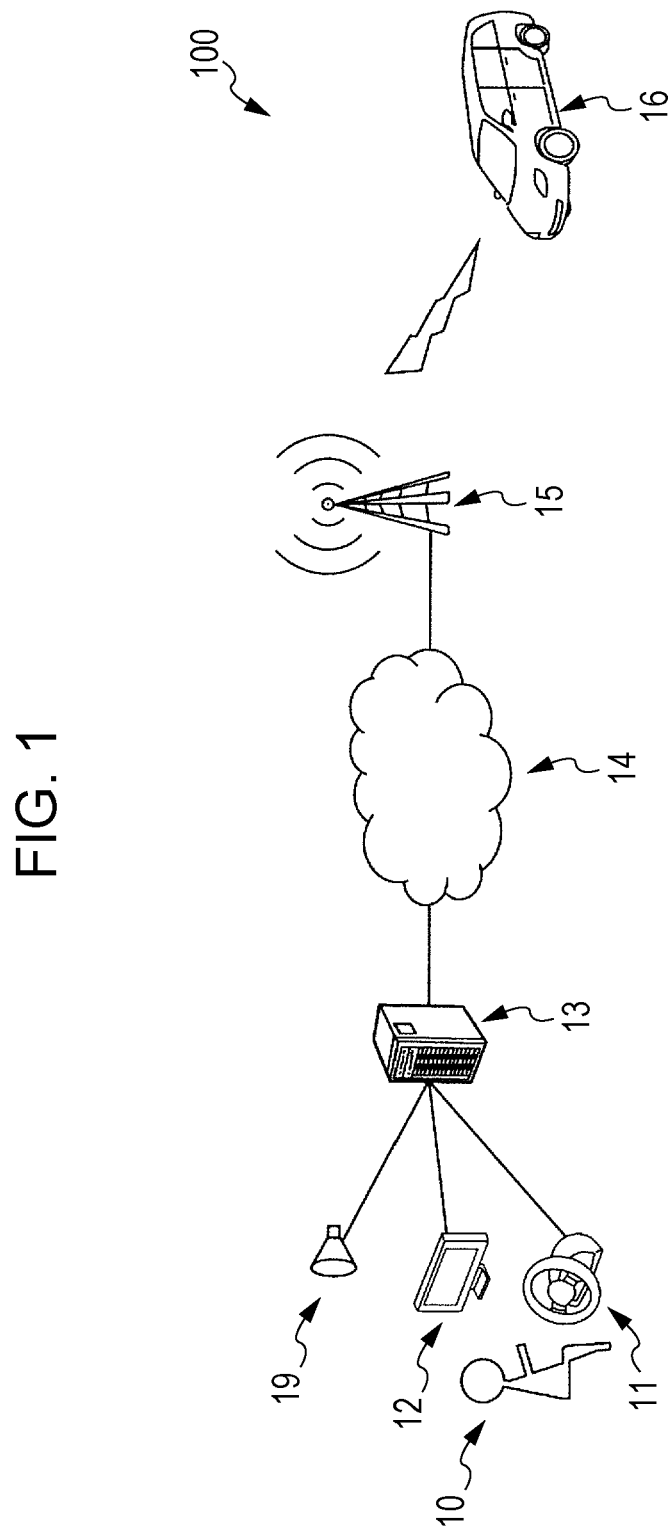
FIG. 1 is a diagram illustrating an example of a remote operation system according to Embodiment 1.

Hereinafter, underlying knowledge forming basis of the present disclosure will be described.

For conventional information processing systems, when any change occurs in circumstances around an operated vehicle, recognition of the circumstance change by the operator at a remote location is likely to be late in general, compared to the case where a driver sitting in a vehicle directly operates the vehicle. As a result, operation of the operated vehicle tends to be late. This is because delay time unique to information processing systems occur, such as a delay time caused by generating information indicating a detection result from an output signal of a sensor mounted on the operated vehicle, a delay time due to communication occurring during the time from when the information indicating the detection result is transmitted from the operated vehicle to when the information reaches a remote operation apparatus, a delay time from when the remote operation apparatus receives the information indicating the detection result to when the information is outputted to a display, a delay time from the output to the display to when an operation signal is generated by an operator operating an operation input apparatus based on the information on the display, and a delay time from the generation of the operation signal to when the vehicle operation signal is received by the operated vehicle via a network and a radio base station. As a result, even though circumstances around the operated vehicle is detected by a sensor, the delay time as described above occur from detection of the sensor to completion of operation of the operated vehicle.

If such delay time occur, circumstances around the operated vehicle will change during the time. Consequently, there is a problem that when another vehicle running ahead of the operated vehicle suddenly stops, late operation of the operated vehicle by an operator due to the delay time increases the risk of the operated vehicle colliding with the vehicle, for example. The more delay time until operation of the operative vehicle, the more prominent the problem will be.

Japanese Patent No. 5366703 discloses an information processing system used for a semi-autonomous unmanned vehicle. The information processing system in Japanese Patent No. 5366703 includes a semi-autonomous unmanned driving vehicle which acquires distance measurement data within the travel range of the vehicle and performs autonomous driving based on the distance measurement data, and which is also remotely operated by operation information transmitted from a remote operation apparatus by operation of an operator at a remote location. The information processing system calculates the delay time between the apparatus used for the remote operation and the semi-autonomous unmanned driving vehicle, and calculates a travel distance of the semi-autonomous driving vehicle considering the delay time. Based on the operation limit information to the semi-autonomous driving vehicle, the information processing system performs remote operation.

However, Japanese Patent No. 5366703 does not consider information indicating movement of obstacles such as other vehicles and pedestrians in the area where the semi-autonomous unmanned driving vehicle travels, and also the movement distances of the obstacles during the delay time caused between the apparatus for the remote operation and the semi-autonomous unmanned driving vehicle. Hence, when communication delay between the apparatus for remote operation and the semi-autonomous unmanned driving vehicle increases, the movement distances of obstacles increase. As a result, the travelable area of the semi-autonomous unmanned driving vehicle is largely different from the actual travelable area. For this reason, further improvements from conventional information systems in which a remote operator operates an operated vehicle are required, such as improvement of safety.

In light of such a situation, an information processing apparatus, operated vehicle, information processing method, and program which allow for improvement of safety of the operated vehicle were studied.

To solve the above problem, an information processing apparatus according to an aspect of the present disclosure for an operator remotely operating an operated vehicle, including: processing circuitry; and storage including at least one set of instructions that, when executed by the processing circuitry, cause the processing circuitry to perform operations including: based on vehicle position information indicating a current position of the operated vehicle acquired by the operated vehicle and delay information indicating a delay time required for information transmission between the operated vehicle and the information processing apparatus, generating first position information indicating a first predicted position of the operated vehicle from the current position of the operated vehicle considering the delay time; based on obstacle position information indicating a current position of at least one obstacle around the operated vehicle acquired by the operated vehicle and the delay information, generating second position information indicating a second predicted position of the at least one obstacle from the current position of the obstacle considering the delay time; and outputting the first position information and the second position information.

According to this configuration, the position information processor generates the first position information indicating the first predicted position of the operated vehicle from the current position of the operated vehicle considering the delay time, and also generates the second position information indicating the second predicted position of at least one obstacle from the current position of the obstacle considering the delay time. The position information processor outputs the first position information and the second position information. Thus, even when the delay time required for the information transmission between the operated vehicle and the remote operation apparatus occurs, it is possible to present to the operator at a remote location, the first position information of the operated vehicle and the second position information of the obstacle considering the delay time. This makes it possible for the operator to recognize information on each of the vehicle predicted position and the obstacle predicted position, and thus leading to an easy remote operation of the operated vehicle.

Consequently, the safety of the operated vehicle is improved. This make it possible for the operator to remotely operate the operated vehicle safely.

An information processing method according to an aspect of the present disclosure is an information processing method for an operator remotely operating an operated vehicle, the method including: based on vehicle position information indicating a current position of the operated vehicle acquired by the operated vehicle and delay information indicating a delay time required for information transmission between the operated vehicle and an information processing apparatus, generating first position information indicating a first predicted position of the operated vehicle from the current position of the operated vehicle considering the delay time; based on obstacle position information indicating a current position of at least one obstacle around the operated vehicle acquired by the operated vehicle and the delay information, generating second position information indicating a second predicted position of the at least one obstacle from the current position of the obstacle considering the delay time; and outputting the first position information and the second position information.

A program according to an aspect of the present disclosure causes a computer to perform the information processing method.

These also exhibit the same operation and effect as described above.

In an information processing apparatus according to an aspect of the present disclosure, the operations further include: based on the vehicle position information, calculating a third predicted position which is different from the first predicted position and which the operated vehicle is predicted to reach after a certain time has passed from the current position of the operated vehicle; and outputting third position information indicating the calculated third predicted position.

According to this configuration, the position information processor calculates the third predicted position which the operated vehicle is predicted to reach after a certain time has passed from the current position of the operated vehicle, based on the vehicle position information. The position information processor outputs the third position information indicating this third predicted position. This makes it possible to present to the operator, the current position of the operated vehicle and the third predicted position indicating the position after a certain time has passed from the current position. This makes it easy to remotely operate the operated vehicle. This allows the operator to make correction or the like on operation of the operated vehicle, and thus more safely operates the operated vehicle.

In an information processing apparatus according to an aspect of the present disclosure, the operations further include: based on the obstacle position information, calculating a travelling direction in which the obstacle is predicted to move from the current position of the obstacle indicated by the obstacle position information; and outputting direction information indicating the calculated travelling direction of the obstacle.

According to this configuration, the direction calculator calculates the travelling direction of the obstacle indicating the direction in which the obstacle is predicted to move from the current position of the obstacle indicated by the obstacle position information, based on the obstacle position information. The direction calculator outputs the direction information indicating the travelling direction. This makes it possible to present to the operator, the current position of obstacle around the operated vehicle and the travelling direction of the obstacle. This allows the operator to quickly distinguish an obstacle to be paid attention when operating the operated vehicle. This allows the operator to easily recognize the states of the operated vehicle and obstacles, and thus to more safely operate the operated vehicle.

In an information processing apparatus according to an aspect of the present disclosure, the operations further include: based on at least the first predicted position and the second predicted position, judging whether a distance between the operated vehicle and the obstacle is smaller than or equal to a specified threshold; and outputting information to call attention on the corresponding obstacle if the distance between the operated vehicle and the obstacle is smaller than or equal to the specified threshold.

According to this configuration, if the distance between the operated vehicle and an obstacle is smaller than or equal to a specified threshold, the judgment processor outputs information to call attention on the corresponding obstacle. This makes it possible to present to the operator in advance, a risk of occurrence of an accident such as collision between the operated vehicle and the obstacle. This allows the operator to easily recognize the states of the operated vehicle and the obstacle from the information to call attention, and thus to more safely operate the operated vehicle.

In an information processing apparatus according to an aspect of the present disclosure, the operations further include: outputting the information to call attention on the corresponding obstacle in a form of an alarm sound if the distance between the operated vehicle and the obstacle is smaller than or equal to the specified threshold.

According to this configuration, if the distance between the operated vehicle and the obstacle is smaller than or equal to the specified threshold, the judgment processor outputs the information to call attention on the corresponding obstacle in a form of an alarm sound. This allows the operator to recognize in advance, a risk of occurrence of an accident such as collision between the operated vehicle and an obstacle. This allows the operator to more safely operate the operated vehicle.

In an information processing apparatus according to an aspect of the present disclosure, the operations further include: based on the vehicle position information and the first position information, calculating a travelling direction in which the operated vehicle is predicted to move from the current position of the operated vehicle indicated by the vehicle position information; based on the travelling direction of the operated vehicle and the travelling direction of the obstacle, judging whether the travelling direction of the operated vehicle intersects the travelling direction of the obstacle; and outputting a stop signal for stopping the operated vehicle to the operated vehicle if the travelling direction of the operated vehicle intersects the travelling direction of the obstacle.

According to this configuration, the direction calculator calculates the travelling direction indicating the direction in which the operated vehicle is predicted to move from the current position of the operated vehicle indicated by the vehicle position information, based on the vehicle position information and the first position information. In addition, if the travelling direction of the operated vehicle intersects the travelling direction of the obstacle, the judgment processor outputs a stop signal for stopping the operated vehicle to the operated vehicle. This makes it possible to stop the travel of the operated vehicle without presenting to the operator, a risk of occurrence of an accident such as collision between the operated vehicle and the obstacle. Since no delay time due to judgment of the operator occurs in this process, the safety of the operated vehicle is improved.

In an information processing apparatus according to an aspect of the present disclosure, the operations further include: measuring second delay information indicating a second delay time obtained by combining the delay time with at least one of a delay time related to processing to generate the vehicle position information, a delay time related to generating the obstacle position information, a delay time related to processing to calculate the first predicted position, a delay time related to processing to calculate the second predicted position, a delay time to output the first predicted position and the second predicted position to a display, and a delay time from when the information processing apparatus generates a vehicle operation signal to operate the operated vehicle to when the operated vehicle receives the vehicle operation signal; and outputting the second delay information.

According to this configuration, it is possible to present the first predicted position of the operated vehicle considering the delay time caused by data processing and the second predicted positions of the obstacles around the operated vehicle to the operator at a remote location operating the operated vehicle, in addition to the delay time required for the information transmission between the operated vehicle and the remote operation apparatus. This improves the operability of the operated vehicle. This allows the operator to more safely operate the operated vehicle.

An operated vehicle according to an aspect of the present disclosure, which an operator remotely operates using an information processing apparatus, includes: a transmitter which transmits to the information processing apparatus, vehicle travel information indicating a travelling state of the operated vehicle including at least one of a steering angle of the operated vehicle, speed of the operated vehicle, acceleration of the operated vehicle, and a travelling direction of the operated vehicle; and a controller which controls information volume of vehicle position information indicating a current position of the operated vehicle, the vehicle travel information, and obstacle position information indicating a current position of at least one obstacle around the operated vehicle, which are to be transmitted to the information processing apparatus, in accordance with communication quality from the operated vehicle to the information processing apparatus and a delay time required for information transmission between the operated vehicle and the information processing apparatus.

This configuration allows the controller to control the information volume of the vehicle travel information transmitted by the operated vehicle, the priority of the vehicle travel information, and the like, in accordance with the communication quality between the operated vehicle and the remote operation apparatus and the delay time required for the information transmission between the operated vehicle and the information processing apparatus. This allows the operated vehicle to transmit necessary information related to the safety in remotely operating the operated vehicle on a high priority basis even when the possible communication rate decreases between the operated vehicle and the remote operation apparatus.

An operated vehicle according to an aspect of the present disclosure, further includes: an image capturer which generates and outputs image information indicating an image of surroundings of around the operated vehicle, in which the controller judges whether a communication rate between the operated vehicle and the information processing apparatus is higher larger than a specified value, and if the communication rate is lower smaller than or equal to the specified value, the controller reduces the information volume of the image information acquired from the image capturer and outputs the reduced image information.

According to this configuration, if the communication rate is lower than or equal to a specified value, the controller reduces the information volume of the image information acquired by the image capturer. This makes it easy to maintain transmission and reception of information in real time between the operated vehicle and the remote operation apparatus.

In an operated vehicle according to an aspect of the present disclosure, the operated vehicle is provided with a plurality of the image capturers, and the controller determines an importance level of each of the image capturers in accordance with behavior of the operated vehicle, reduces the information volume of the image information generated by each image capturer in accordance with the importance level, and outputs the reduced image information.

According to this configuration, the controller reduces the information volume of the image information generated by the image capturer, in accordance with the importance level. For example, when the operated vehicle turns, the image information captured by the camera that captures the turning direction becomes important, and the importance levels of images captured by the other cameras decrease. Since the image information captured by the camera that captures the turning direction has a high importance level, the information volume of this image information is not reduced at all or reduced little. In this way, reducing the information volume of image information with a low importance level makes it easy to maintain transmission and reception of information in real time between the operated vehicle and the remote operation apparatus. In addition, it is possible to obtain clear images for image information with a high importance level.

Note that these general or specific aspects may be provided by a system, method, integrated circuit, computer program, or computer-readable recording medium such as a CD-ROM, or may be provided by any combination of a system, method, integrated circuit, computer program, and recording medium.

Note that each of the embodiments described hereafter illustrates a specific example of the present disclosure. Values, shapes, constituents, steps, the orders of steps shown in the embodiments below are mere examples and are not intended to limit the present disclosure. In addition, of the constituents in the following embodiments, the constituents which are not recited in an independent claim representing the highest level concept are described as optional constituents. Moreover, contents in each embodiment can be combined with contents in other embodiments.

Note that each figure is a schematic one, and is not necessarily illustrated precisely. In each figure, substantially the same constituents are denoted by the same symbols, and repetitive descriptions are omitted or simplified.

Embodiment 1

[Configuration of Remote Operation System]

The configuration of a remote operation system 100 in Embodiment 1 will be described using FIG. 1.

FIG. 1 is a diagram illustrating an example of a remote operation system which operates an operated vehicle 16 from a remote location.

As illustrated in FIG. 1, the remote operation system 100 is a system communicably connecting the operated vehicle 16 and a remote operation apparatus 13 to each other via a network 14 and a radio base station 15 for a wireless LAN, communication terminals, or the like. The remote operation system 100 includes an operation input apparatus 11, a display 12, a speaker 19, the operated vehicle 16, and the remote operation apparatus 13 with which an operator 10 at a remote location operates the operated vehicle remotely. The remote operation apparatus 13 is an example of an information processing apparatus.

The display 12 is an apparatus that displays the states of the operated vehicle 16 and obstacles around the operated vehicle 16 for the operator 10. The display 12 is connected to the remote operation apparatus 13, and is, for example, a monitor which displays the operated vehicle 16 and obstacles around the operated vehicle 16. The display 12 allows the operator 10 at a remote location to recognize the states of the operated vehicle 16 and the obstacles. Multiple displays 12 may be connected to the remote operation apparatus 13.

The term "obstacle" used herein means people, vehicles other than the operated vehicle 16, and the like, and mainly means moving objects which may be obstacles when the operated vehicle 16 travels. Note that obstacles may include real estates fixed to the ground.

The operation input apparatus 11 is connected to the remote operation apparatus 13 and is an apparatus into which remote operation by the operator 10 is inputted. The operation input apparatus 11 is, for example, a handle, a foot pedal, or the like and is an apparatus for operating the operated vehicle 16. The operation input apparatus 11 is connected to the remote operation apparatus 13 and outputs an inputted vehicle operation signal to the remote operation apparatus 13.

The speaker 19 is connected to the remote operation apparatus 13 and outputs an alarm sound to the operator 10 to call attention to obstacles, allowing the operator 10 to recognize the approach of danger.

The operated vehicle 16 acquires sensing information indicating sensing results on the operated vehicle 16 and the periphery of the operated vehicle 16 from various sensors mounted on the operated vehicle 16 such as millimeter wave radars 1611, laser radars 1610, and cameras 1612 illustrated in FIG. 2 to be described later, and transmits the sensing information to the remote operation apparatus 13 via the radio base station 15 and the network 14. Hereinafter, the millimeter wave radars 1611, the laser radars 1610, and the camera 1612 are collectively called sensors.

The operated vehicle 16 receives the vehicle operation signal, outputted by the operator 10 operating the operation input apparatus 11, from the operation input apparatus 11 via the remote operation apparatus 13, the network 14, and the radio base station 15, and is operated based on the vehicle operation signal.

The operator 10, operating the operated vehicle 16 from a remote location, operates the operation input apparatus 11 based on the states of the operated vehicle 16 and obstacles displayed on the display 12. The states of the operated vehicle 16 and the obstacles correspond to a map image to be described later.

[Configuration of Operated Vehicle]

Next, the configuration of the operated vehicle 16 in this embodiment will be described using FIG. 2. FIG. 2 is a block diagram illustrating an example of the configuration of the operated vehicle 16 according to this embodiment.

Figure 2:
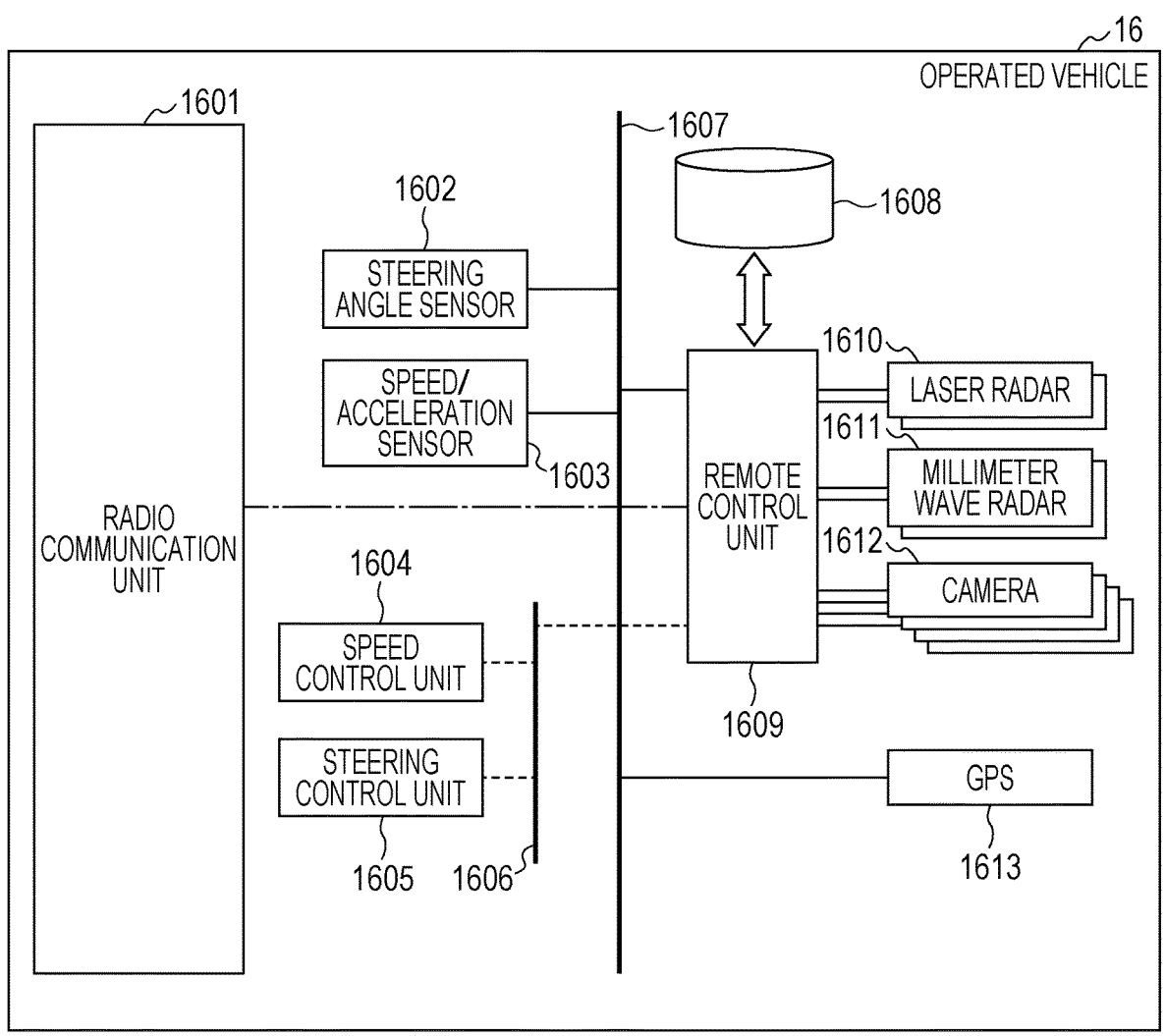
FIG. 2 is a block diagram illustrating an example of the configuration of an operated vehicle in the remote operation system according to Embodiment 1.

As illustrated in FIG. 2, the operated vehicle 16 is a vehicle capable of autonomous driving based on travel data held beforehand in the vehicle, travel data generated based on information detected by sensors and the like, and other data, and capable of automated driving by being remotely operated under a certain condition by the operator 10 at a remote location.

The operated vehicle 16 includes a radio communication unit 1601, a steering angle sensor 1602, a speed/acceleration sensor 1603, a speed control unit 1604, a steering control unit 1605, in-vehicle networks 1606 and 1607, a map database 1608, a remote control unit 1609, one or more laser radars 1610, one or more millimeter wave radars 1611, one or more cameras 1612, and a GPS (Global Positioning System) 1613.

The cameras 1612 are provided at positions which allow for capturing images of the front, back, right, and left directions of the operated vehicle 16. In other words, the cameras 1612 are provided on the operated vehicle 16 so as to be able to capture the surroundings of the operated vehicle 16. The cameras 1612 output captured images of the surroundings of the operated vehicle 16 to the remote control unit 1609. The term "images" used herein are intended to include moving images and still images. The cameras 1612 are an example of an image capturer.

Note that although the operated vehicle 16 includes the laser radars 1610 and the millimeter wave radars 1611 in this embodiment, these are not essential constituents required for the operated vehicle 16, and thus the operated vehicle 16 does not need to include these.

The radio communication unit 1601 is a communication apparatus which performs radio communication with the radio base station 15. The radio communication unit 1601 transmits vehicle position information, vehicle travel information, image information, obstacle position information, sensing information including time information indicating the time of sensing, which are to be described later, to the remote operation apparatus 13 via the radio base station 15 and the network 14. The radio communication unit 1601 is an example of a transmitter.

The steering angle sensor 1602 is a sensor which measures the steering angle of wheels of the operated vehicle 16 and outputs steering angle information on the steering angle to the in-vehicle network 1607.

The speed/acceleration sensor 1603 measures the speed and acceleration of the operated vehicle 16 and outputs vehicle travel information including the measure speed and acceleration to the in-vehicle network 1607.

The speed control unit 1604 is an apparatus which controls the speed by operating the acceleration, break, and shifter of the operated vehicle 16. The speed control unit 1604 is, for example, an ECU (engine control unit). The speed control unit 1604 receives the vehicle operation signal outputted from the operation input apparatus 11 via the remote operation apparatus 13, network 14, radio base station 15, and radio communication unit 1601.

The steering control unit 1605 is an apparatus which controls the speed and steering of the operated vehicle 16 in accordance with the vehicle operation signal. The steering control unit 1605 is capable of controlling the traveling direction of the operated vehicle 16 by operating the steering of the operated vehicle 16. The steering control unit 1605 also receives the vehicle operation signal outputted from the operation input apparatus 11, via the remote operation apparatus 13, network 14, radio base station 15, and radio communication unit 1601.

The in-vehicle networks 1606 and 1607 are transmission paths for transmitting information communicated between the sensors and the units mounted on the operated vehicle 16, such as a CAN (Control Area Network). The in-vehicle networks 1606 and 1607 may be integrated into one, or they may be constituted of three or more networks.

The map database 1608 stores map information on structures such as roads and buildings. The map database 1608 is recorded, for example, on a recording medium such as a hard disk or a semiconductor memory.

The remote control unit 1609 generates the sensing information to be transmitted to the remote operation apparatus 13. Specifically, the remote control unit 1609 generates the vehicle position information indicating the current position of the operated vehicle 16 at the time of measuring the operated vehicle 16, based on the sensing information of the operated vehicle 16 acquired from the steering angle sensor 1602, speed/acceleration sensor 1603, map database 1608, laser radars 1610, cameras 1612, and GPS 1613. Note that the vehicle position information may include lane identification information of the road on which the operated vehicle 16 travels, the lane identification information being stored in the map database 1608.

In addition, the remote control unit 1609 generates the vehicle travel information indicating the travelling state of the operated vehicle 16 including at least one or more of the steering angle of the operated vehicle 16, the speed of the operated vehicle 16, the acceleration of the operated vehicle 16, and the travelling direction of the operated vehicle 16, from the operation of the operated vehicle 16 such as acceleration, braking, shifting, and steering, based on the sensing information acquired from the steering angle sensor 1602 and the speed/acceleration sensor 1603.

Moreover, the remote control unit 1609 generates the image information on the surroundings of the operated vehicle 16 based on the sensing information acquired from one or more cameras 1612. The image information on the surroundings of the operated vehicle 16 may be generated as independent pieces of image information each indicating the front, rear, right, and left directions of the operated vehicle 16, or may be generated by synthesizing image information of the front, rear, right, and left directions of the operated vehicle 16 into one piece of image information.

In addition, the remote control unit 1609 detects obstacles around the operated vehicle 16 based on the sensing information acquired from the sensors which are the laser radars 1610, millimeter wave radars 1611, and cameras 1612 to generate the obstacle position information indicating the current positions of the obstacles. Note that the obstacle position information may include information on the current position of each obstacle, the speed of the obstacle, the acceleration of the obstacle, the travelling direction of the obstacle, the size of the obstacle, and the type of the obstacle. The type of the obstacle is a type which distinguishes, for example, a pedestrian, a motor bike, a bicycle, and an automobile from one another. The current position of an obstacle indicates the position of the obstacle when the sensors sense the obstacle.

Next, the remote control unit 1609 transmits the vehicle position information, vehicle travel information, image information, and obstacle position information to the remote operation apparatus 13 via the radio communication unit 1601.

The remote control unit 1609 controls the information volume of the vehicle position information, vehicle travel information, image information, and obstacle position information, which are to be sent to the remote operation apparatus 13, in accordance with the communication quality from the operated vehicle 16 to the remote operation apparatus 13, and the delay time required for the information transmission between the operated vehicle 16 and the remote operation apparatus 13. The remote control unit 1609 changes the information volume of the vehicle position information, vehicle travel information, image information, and obstacle position information or selectively transmits these pieces of the information to control the communication volume. The remote control unit 1609 is an example of a controller.

The remote control unit 1609 determines whether the communication rate between the operated vehicle 16 and the remote operation apparatus 13 is higher than a specified value. If the communication rate is lower than or equal to the specified value, the remote control unit 1609 determines the importance level of the cameras 1612 in accordance with the behavior of the operated vehicle 16. According to the importance level, the remote control unit 1609 reduces the information volume of the image information generated by the cameras 1612, and outputs the reduced image information to the remote operation apparatus 13. The behaviors of the operated vehicle 16 include a right turn or a left turn of the operated vehicle 16, a lane change of the operated vehicle 16, and braking of the operated vehicle 16. In accordance with the behavior of the operated vehicle 16, the importance level differs for each camera 1612. In other words, the importance level differs for image information generated by each camera 1612. Specifically, when the operated vehicle 16 turns, the image information captured by the camera 1612 that captures the turning direction becomes important, and the importance levels of images captured by the other cameras 1612 decrease. Accordingly, the importance levels of image information generated by the cameras 1612 other than that for the turning direction are set low. Since the image information captured by the camera 1612 that captures the turning direction has a high importance level, the importance level thereof is set higher than those of the image information generated by the cameras 1612 other than that for the turning direction.

Then, the remote control unit 1609 does not reduce the information volume of image information with a high importance level, or reduces only a little. The remote control unit 1609 relatively reduces the information volume of image information with a low importance level. In other words, the remote control unit 1609 reduces the information volume of image information with a low importance level from the current information volume. Alternatively, the remote control unit 1609 reduces the information volume of image information with a low importance level relative to the information volume of image information with a high importance level.

For example, in the case where the communication rate is low because of deterioration of the radio wave environment between the radio base station 15 and the operated vehicle 16, the remote control unit 1609 with such a configuration reduces the bit rate or the like of image formation with a relatively high volume to or below the communication rate, in other words, reduces the information volume of the image information on a high priority basis relative to the sensing information. This makes it easy to maintain transmission and reception of information in real time between the operated vehicle 16 and the remote operation apparatus 13.

Note that the remote control unit 1609 may select specific cameras 1612 out of the multiple cameras 1612 mounted on the operated vehicle 16 according to the driving scene of the operated vehicle 16 and reduce the bit rate of the image information corresponding to the selected cameras 1612. For example, when the operated vehicle 16 turns, the image information captured by the camera 1612 that captures the turning direction becomes important, and the importance levels of images captured by the other cameras 1612 decrease. Accordingly, the image information of the other cameras 1612 is reduced on a high priority bases.

The remote control unit 1609 receives the vehicle operation signal transmitted by the remote operation apparatus 13 via the radio communication unit 1601. The remote control unit 1609 controls the speed control unit 1604 and the steering control unit 1605 based on the received vehicle operation signal to control the travel of the operated vehicle 16.

Note that the remote control unit 1609 may measure the delay time from when the operation input apparatus 11 generates a vehicle operation signal for operating the operated vehicle 16 to when the operated vehicle 16 receives the vehicle operation signal and transmit delay information indicating the delay time of the measurement result to the remote operation apparatus 13. The term "delay time" used here is a time required for the information transmission between the operated vehicle 16 and the remote operation apparatus 13.

The laser radars 1610 are sensors which are arranged on the periphery of the operated vehicle 16 and emit and receive laser light to measure the distance between the operated vehicle 16 and the surrounding objects irradiated with the laser light. Alternatively, the position of sending light of the laser radar 1610 can be changed to measure the 3-D shape of an object from the result of receiving the light.

The millimeter wave radars 1611 are sensors which are located on the periphery of the operated vehicle 16 and transmit and receive radio waves in a millimeter wave range to measure the distances and relative speeds between the operated vehicle 16 and the surrounding objects reflecting the radio waves.

The GPS 1613 is a sensor which measures the current position of the operated vehicle 16.

[Configuration of Remote Operation Apparatus]

Figure 3:
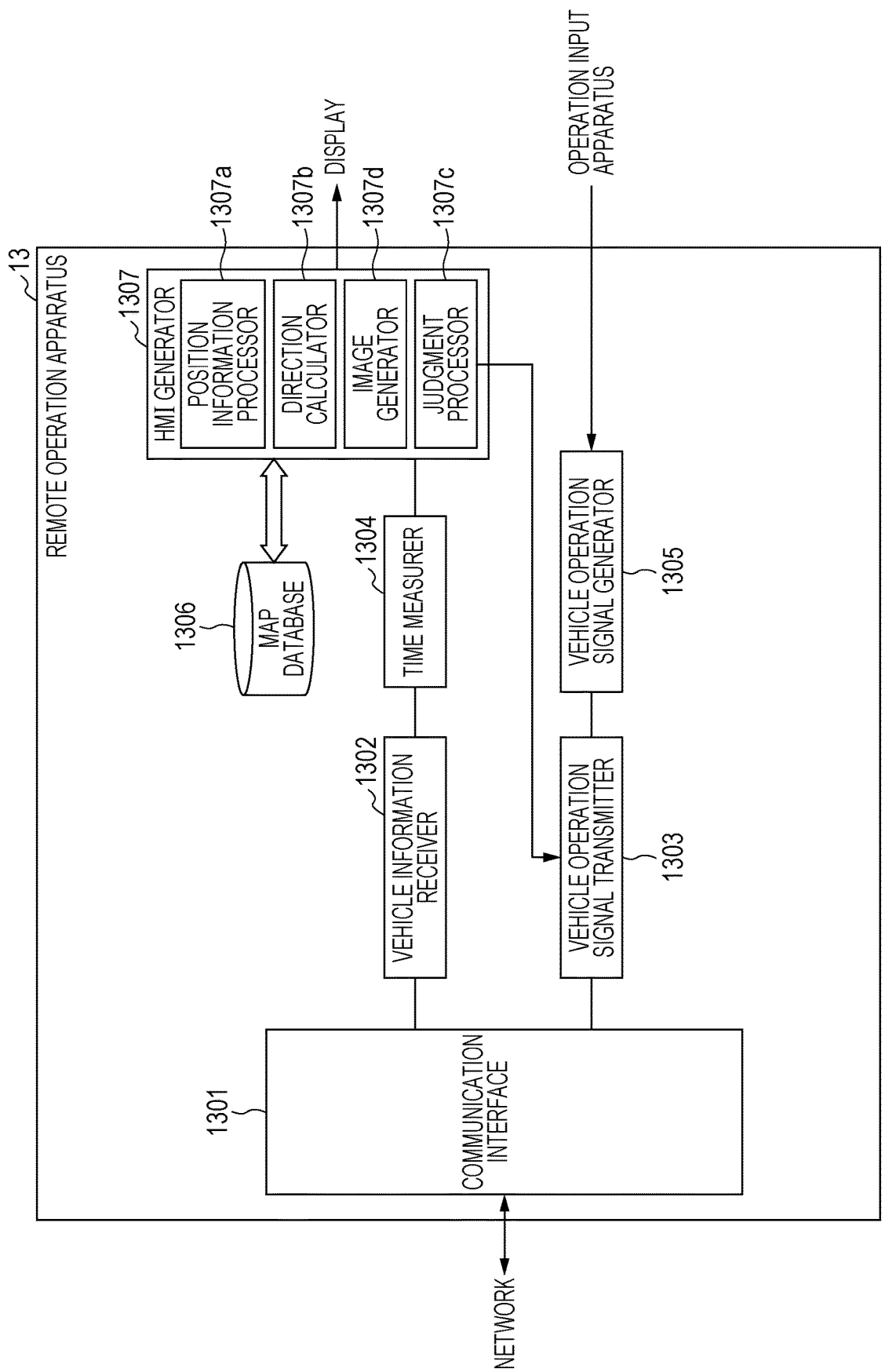
FIG. 3 is a block diagram illustrating an example of the configuration of a remote operation apparatus in the remote operation system according to Embodiment 1.

Next, the configuration of the remote operation apparatus 13 in this embodiment will be described using FIG. 3. FIG. 3 is a block diagram illustrating an example of the configuration of the remote operation apparatus 13 according to Embodiment 1.

As illustrated in FIG. 3, the remote operation apparatus 13 includes a communication interface 1301, a vehicle information receiver 1302, a vehicle operation signal transmitter 1303, a time measurer 1304, a vehicle operation signal generator 1305, a map database 1306, an HMI generator 1307.

The communication interface 1301 is a communicator which is connected to the network 14 and communicates with the operated vehicle 16 via the network 14 and the radio base station 15.

The vehicle information receiver 1302 receives at least the vehicle position information, vehicle travel information, image information and obstacle position information transmitted by the operated vehicle 16 via the communication interface 1301.

The time measurer 1304 measures the delay time required for information transmission between the operated vehicle 16 and the remote operation apparatus 13 via the radio base station 15 and the network 14. The time measurer 1304, for example, measures the time difference from when the sensors, which are the laser radars 1610, millimeter wave radars 1611, and cameras 1612, sense the operated vehicle 16 and obstacles to when the time measurer 1304 acquires the sensing information which these sensors sensed. The time measurer 1304 may be, for example, a timer.

Regarding the delay time, the time measurer 1304 calculates delay information indicating a delay time, not only using the time required for the information transmission between the operated vehicle 16 and the remote operation apparatus 13, but also additionally combining at least one or more of the delay time related to processing to generate the vehicle position information, the delay time related to generation of the obstacle position information, the delay time related to processing to calculate a first predicted position, the delay time related to processing to calculate second predicted positions, the delay time for outputting the first and second predicted positions to the display 12, and the delay time from when the remote operation apparatus 13 generates vehicle operation signal for operating the operated vehicle 16 to when the operated vehicle 16 receives the vehicle operation signal. The latter four delay times will be described later. The time measurer 1304 outputs the delay information to a position information processor 1307a. Note that regarding the delay time, the time measurer 1304 may calculate the delay information indicating the delay time, combining the delay time related to processing to calculate a third predicted position, which will be described later.

The vehicle operation signal generator 1305 generates the vehicle operation signal based on operation of the operation input apparatus 11 by the operator 10 and outputs the generated vehicle operation signal to the vehicle operation signal transmitter 1303.

The vehicle operation signal transmitter 1303 transmits the vehicle operation signal generated by the vehicle operation signal generator 1305 to the operated vehicle 16 via the communication interface 1301, the network 14, and the radio base station 15.

The map database 1306 is a database which stores map information related to structures such as roads.

The HMI generator 1307 generates a map image necessary for the operator 10 to operate the operated vehicle 16 based on the vehicle position information, vehicle travel information, obstacle position information, image information, delay time, and map information, and output the map image to the display 12. Specifically, the HMI generator 1307 includes the position information processor 1307a, a direction calculator 1307b, a judgment processor 1307c, and an image generator 1307d.

The position information processor 1307a generates first position information indicating a first predicted position of the operated vehicle 16 from the current position of the operated vehicle 16 considering the delay time, based on the vehicle position information indicating the current position of the operated vehicle 16 acquired by the operated vehicle 16 and the delay information indicating the delay time required for the information transmission between the operated vehicle 16 and the remote operation apparatus 13. The position information processor 1307a outputs the first position information indicating the calculated first predicted position to the display 12 via the image generator 1307d and the judgment processor 1307c.

The position information processor 1307a acquires the steering angle information indicating the steering angle of the operated vehicle 16 from the operated vehicle 16. The position information processor 1307a calculates a third predicted position which is different from the first predicted position and which the operated vehicle 16 is predicted to reach after a specified time has passed since the time of the current position of the operated vehicle 16, based on the vehicle position information and the steering angle information. Details of calculation of the third predicted position will be described later. Then, the position information processor 1307a outputs third position information indicating the calculated third predicted position to the display 12 via the image generator 1307d.

Note that the position information processor 1307a may calculate multiple third predicted positions. In this case, a predicted path may be drawn from the multiple third predicted positions. The third predicted position may be a position before the first predicted position.

In addition, the position information processor 1307a generates second position information indicating second predicted positions of one or more obstacles from the current positions of the obstacles considering the delay time, based on the obstacle position information indicating the obstacle current positions of one or more obstacles around the operated vehicle 16 acquired by the operated vehicle 16, and the delay information. The position information processor 1307a outputs the second position information indicating the calculated second predicted positions to the display 12 via the image generator 1307*d* and the judgment processor 1307*c*.

As for a method of calculating the first predicted position, the position information processor 1307*a* may calculate the first predicted position from the current position of the operated vehicle 16 considering the delay time, using the current position of the operated vehicle 16, the speed of the operated vehicle 16 indicated by the vehicle travel information, and the travelling direction of the operated vehicle 16.

In addition, as for a method of calculating the first predicted position, the position information processor 1307*a* may store information indicating the current positions of the operated vehicle 16 measured at intervals of a unit time in a storage apparatus such as a memory, and calculate the first predicted position from the unit time and the speed of the operated vehicle 16.

The direction calculator 1307*b* calculates the travelling direction of an obstacle indicating the direction in which the obstacle is predicted to move from the current position of the obstacle indicated by the obstacle position information, based on the obstacle position information. The direction calculator 1307*b* outputs direction information of the obstacle indicated by the calculated travelling direction of the obstacle to the display 12, with which the operator 10 at a remote location recognizes the states the operated vehicle 16 and obstacles, via the image generator 1307*d* and the judgment processor 1307*c*.

As for a method of calculating the travelling direction of an obstacle, for example, the travelling direction of an obstacle may be calculated from the change from the position of the obstacle at a first sensing to the position of the obstacle at a second sensing.

In addition, the direction calculator 1307*b* also calculates the travelling direction of the operated vehicle 16 indicating the direction in which the operated vehicle 16 is predicted to move from the current position of the operated vehicle 16 indicated by the vehicle position information, based on the vehicle position information and the first position information. The travelling direction of the operated vehicle 16 can be obtained, for example, by detecting the steering angle of the operated vehicle 16 with the steering control unit 1605. The direction calculator 1307*b* outputs the direction information of the operated vehicle 16 indicated by the calculated travelling direction of the operated vehicle 16 to the display 12 via the image generator 1307*d* and the judgment processor 1307*c*.

The judgment processor 1307*c* judges whether the distance between the operated vehicle 16 and an obstacle is smaller than or equal to a specified threshold, based on the first predicted position and the second predicted position. If the distance between the operated vehicle 16 and an obstacle is smaller than or equal to the specified threshold, the judgment processor 1307*c* outputs information to call attention on the corresponding obstacle to the display 12. As information to call attention on the obstacle, the color of the obstacle close to the operated vehicle 16 in the map image is changed to make it easy for the operator 10 to recognize the approach of a danger. Information to call attention on an obstacle is not limited to changing the color of the corresponding obstacle, but the information may be flashing for easy recognition of the operator 10, or outputting an alarm sound via the speaker 19 or the like. Note that although the judgment processor 1307*c* is provided in the HMI generator 1307, the judgment processor 1307*c* may be configured as an apparatus separated from the HMI generator 1307.

In addition, the judgment processor 1307*c* judges whether the travelling direction of the operated vehicle 16 intersect the travelling direction of an obstacle based on the travelling direction of the operated vehicle 16 and the travelling direction of the obstacle. If the travelling direction of the operated vehicle 16 intersects the travelling direction of the obstacle intersects, the judgment processor 1307*c* outputs a stop signal for stopping the travel of the operated vehicle 16 to the operated vehicle 16. Details of the output of the stop signal will be described later.

Note that the judgment processor 1307*c* may output to the vehicle operation signal generator 1305 the judgment result of whether the travelling direction of the operated vehicle 16 intersects the travelling direction of an obstacle. In this case, the vehicle operation signal generator 1305 may output the stop signal for stopping the travel of the operated vehicle 16 to the operated vehicle 16. In this case, the stop signal may be included in the vehicle operation signal.

The image generator 1307*d* of the HMI generator 1307 outputs to the display 12, a map image in which the first position information, the second position information, the direction information of the operated vehicle 16, and the direction information of obstacles are associated with the map information. Specifically, the image generator 1307*d* maps the first predicted position and the second predicted positions indicated by the first position information and the second position information generated by the position information processor 1307*a*, on a map indicated by the map information stored in the map database 1306. In addition, the image generator 1307*d* maps the third predicted position indicated by the third position information on the map indicated by the map information stored in the map database 1306. Further, the image generator 1307*d* maps the travelling direction of obstacles indicated by the direction information of the obstacles on the map indicated by the map information stored in the map database 1306. Note that the travelling direction of the operated vehicle 16 may be further mapped on the map indicated by the map information.

In this way, the image generator 1307*d* generates a map image in which the first predicted position, the second predicted position, the third predicted position, the travelling directions of the obstacles are mapped on the map indicated by the map information stored in the map database 1306.

The image generator 1307*d* outputs the map image to the display 12. This map image is information necessary for the operator 10 to remotely operate the operated vehicle 16.

Next, new map information outputted to the display 12 will be described using FIG. 4.

Figure 4:
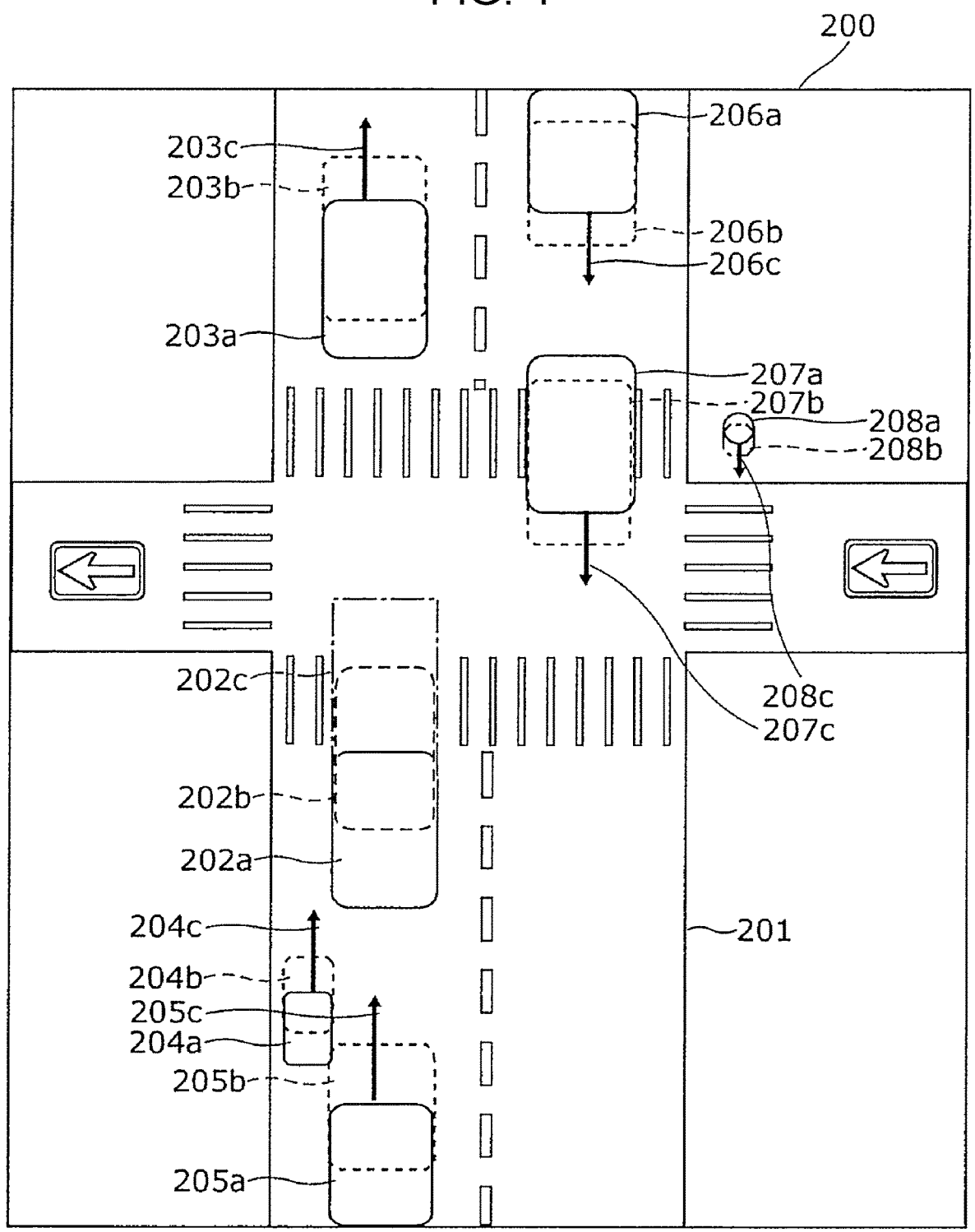
FIG. 4 is a diagram illustrating an example of an output screen in a display displaying information generated by an HMI (Human Machine Interface) generator in the remote operation apparatus in the remote operation system according to Embodiment 1.

FIG. 4 is a diagram illustrating an example of an output screen when the display 12 displays a map image generated by the HMI generator 1307 in the remote operation apparatus 13 of the remote operation system according to this embodiment.

As illustrated in FIG. 4, an output screen 200 of the display 12 is displayed on all or part of a display screen of the display 12. Displayed on the output screen 200 is a map image 201.

The map image 201 is generated including the map information stored in the map database 1306, a vehicle current position 202*a*, a vehicle predicted position 202*b*, a vehicle predicted position 202*c*, and other information. In the map image 201 is displayed a road on which the operated vehicle 16 is travelling, roads around it, and information related to traffic signs.

Information related to the operated vehicle 16 includes the vehicle position information indicating the vehicle current position 202*a*, the first position information indicating the vehicle predicted position 202b, and the third position information indicating the vehicle predicted position 202c.

The vehicle current position 202a is displayed at the corresponding position on the map image 201 on the display 12 based on the vehicle position information.

The vehicle predicted position 202b indicates the first predicted position of the operated vehicle 16 from the vehicle current position 202a considering the delay time. The vehicle predicted position 202b is displayed at the corresponding position on the map image 201 based on at least the vehicle position information and the delay time. In addition, the vehicle predicted position 202b may be calculated, additionally considering the vehicle travel information.

Descriptions will be provided for an example of a method of obtaining the vehicle predicted position 202b based on the vehicle position information and the delay time.

Assuming the travelling direction of the operated vehicle 16 is the x axis direction and the lateral direction is the y axis direction, the vehicle predicted position 202b can be obtained by the following Expression (1) and Expression (2), where $(x_{t2}, y_{t2}, 0)$ is the vehicle predicted position at time t2, $(x_{t1}, y_{t1}, 0)$ is the vehicle current position at time t1, $v_x$ is the speed in the x axis direction, vy is the speed in the y axis direction, $a_x$ is the acceleration in the x axis direction, $a_y$ is the acceleration in the y axis direction, and D is the delay time. Assume that the relation among time t1, time t2, and delay time D is t2=t1+D. The number 0 indicated in the vehicle current position shows the z axis direction orthogonal to the x axis and the y axis.

$$x_{t2} = x_{t1} + v_x D + \frac{a_x D^2}{2} \qquad \text{Expression (1)}$$

$$y_{t2} = y_{t1} + v_y D + \frac{D_y D^3}{2} \qquad \text{Expression (2)}$$

Note that at least one of the delay time related to processing to generate the vehicle position information, the delay time related to processing to calculate the vehicle predicted position, and the delay time to output the vehicle predicted position 202b to the display 12 may be added in advance to delay time D.

Assuming, for example, that vx(t) is the speed in the x axis direction at time t, and $a_x$ is the acceleration in the x axis direction, the speed and the acceleration can be obtained by Expression (3) and Expression (4), respectively.

$$v_x = \lim_{\Delta t \to 0} \frac{x_{t+\Delta t} - x_t}{\Delta t} \qquad \text{Expression (3)}$$

$$a_x = \lim_{\Delta t \to 0} \frac{v_x(t + \Delta t) - v_x(t)}{\Delta t} \qquad \text{Expression (4)}$$

Note that the HMI generator 1307 may use the vehicle travel information supplementarily to calculate the vehicle predicted position 202b.

The vehicle predicted position 202c indicates the position which the operated vehicle 16 reaches after a certain time has passed since the time of the current position of the operated vehicle 16 based on the vehicle position information, and is displayed at the corresponding position on the map image 201 on the display 12. The vehicle predicted position 202c is an example of a third predicted position. Although the vehicle predicted position 202c is displayed at a position advanced from the first predicted position in FIG. 4, the vehicle predicted position 202c can be a position before the first predicted position. In other words, the certain time may be the same as or different from the time from the time of the current position to the time of the first predicted position.

The vehicle predicted position 202c can be obtained, for example, by using a certain elapsed time instead of the delay time in Expressions (1) to (4). Note that the HMI generator 1307 may use the vehicle travel information supplementarily to calculate the vehicle predicted position 202c.

On the map image 201 displayed on the output screen 200 are also indicated current positions (203a, 204a, 205a, 206a, 207a, 208a) of the obstacles, obstacle predicted positions (203b, 204b, 205b, 206b, 207b, 208b), and obstacle movement vectors (203c, 204c, 205c, 206c, 207c, 208c), which are associated with at least one or more obstacles around the operated vehicle 16.

The current positions (203a, 204a, 205a, 206a, 207a, 208a) of the obstacles are displayed at the corresponding positions on the map image 201 on the display 12 based on the obstacle position information indicating the positions of one or more obstacles around the operated vehicle 16.

The obstacle predicted positions (203b, 204b, 205b, 206b, 207b, 208b) indicate predicted positions considering the delay time. The obstacle predicted positions (203b, 204b, 205b, 206b, 207b, 208b) are displayed at the corresponding positions on the map image 201 based on the obstacle position information and the delay time. Note that the obstacle predicted positions (203b, 204b, 205b, 206b, 207b, 208b) can be obtained by substituting the current positions (203a, 204a, 205a, 206a, 207a, 208a) of the obstacles in to Expressions (1) to (4). The obstacle predicted positions (203b, 204b, 205b, 206b, 207b, 208b) are an example of a second predicted position.

Note that one or more of the delay time related to processing to calculate the obstacle predicted positions (203b, 204b, 205b, 206b, 207b, 208b), the delay time to output the obstacle predicted positions (203b, 204b, 205b, 206b, 207b, 208b) to the display 12, and the delay time from when the vehicle operation signal is generated to when the operated vehicle 16 receives the vehicle operation signal, may be added in advance to delay time D in Expressions (1) and (2).

The obstacle movement vectors (203c, 204c, 205c, 206c, 207c, 208c) indicate the travelling directions of the obstacles, and are displayed at the positions corresponding to the obstacles on the map image 201 on the display 12, based on the obstacle position information. For example, in the case where an obstacle on the map image 201 is at the current position 203a of the obstacle, the obstacle movement vector 203c is indicated corresponding to the obstacle. The obstacle movement vectors (203c, 204c, 205c, 206c, 207c, 208c) are an example of a travelling direction of an obstacle.

Note that the HMI generator 1307 may output to the display 12, information on the vehicle current position 202a, the vehicle predicted position 202b, the vehicle predicted position 202c, the current positions (203a, 204a, 205a, 206a, 207a, 208a) of the obstacles, the obstacle predicted positions (203b, 204b, 205b, 206b, 207b, 208b), and the obstacle movement vectors (203c, 204c, 205c, 206c, 207c, 208c), or at least part of these pieces of the information may be hidden, depending on the operation state of the operator 10 and the state of the operated vehicle 16.

Note that regarding one or more obstacles which have become likely to contact or collide with the operated vehicle 16 based on at least the vehicle predicted position 202b and the obstacle predicted positions (203b, 204b, 205b, 206b, 207b, 208b), the HMI generator 1307 may notify the operator 10 of a risk of the operated vehicle 16, for example, by changing the color indicating the current positions (203a, 204a, 205a, 206a, 207a, 208a) of the obstacles and the obstacle predicted positions (203b, 204b, 205b, 206b, 207b, 208b) illustrated in FIG. 4. For example, to judge that the possibility of contact and collision is high, a method is conceivable as an example, which includes selecting the obstacles of which the travelling directions coincide with or intersect the travelling direction of the operated vehicle 16, checking the difference between the obstacle predicted position of each selected obstacle and the vehicle predicted position, and if the difference is smaller than a specified distance, judging that the obstacle has high possibility.

Next, an example of a method of judging the possibility of contact or collision between the operated vehicle 16 and an obstacle.

First, descriptions will be provided for a method of judging whether the travelling direction of the operated vehicle 16 intersects the travelling direction of an obstacle. In Expressions (5) and (6), $(x_{t1}, y_{t1}, z_{t1})$ represents the current position of the operated vehicle 16, $(xt_2, y_{t2}, z_{t2})$ represents the vehicle predicted position after a specified time (T seconds) has passed since the time of the current position $(x_{t1}, y_{t1}, z_{t1})$, $(X_{t1}, Y_{t1}, Z_{t1})$ represents the current position of an obstacle indicated by the obstacle position information, and $(X_{t2}, Y_{t2}, Z_{t2})$ represents the obstacle predicted position after the specified time (T seconds) has passed since the time of the current position $(X_{t1}, Y_{t1}, Z_{t1})$. Note that $z_{t1}$, $z_{t2}$, $Z_{t1}$, and $Z_{t2}$ are 0 s because they are coordinates of the height direction.

$$\alpha=(x_{t1}-x_{t2})(Y_{t1}-y_{t1})+(y_{t1}-y_{t2})(x_{t1}-X_{t1}) \quad \text{Expression (5)}$$

$$\beta=(x_{t1}-x_{t2})(Y_{t2}-y_{t1})+(y_{t1}-y_{t2})(x_{t1}-X_{t2}) \quad \text{Expression (6)}$$

$$\alpha \times \beta < 0 \quad \text{Expression (7)}$$

If Expression (7) holds true based on Expressions (5) and (6), it is possible to judge that the travelling direction of the operated vehicle 16 intersects the travelling direction of the obstacle. In this case, the judgment processor 1307c outputs a stop signal for stopping the travel of the operated vehicle 16 to the operated vehicle 16. Note that whether the travelling directions of the operated vehicle 16 and an obstacle are the same can be judged by checking whether the operated vehicle 16 and the obstacle are in the same lane or lanes in the same travelling direction.

Next, how to obtain the distance between the operated vehicle 16 and an obstacle will be described.

Assuming that $(x_{t2}, y_{t2}, z_{t2})$ represents the vehicle predicted position, and $(X_{t2}, Y_{t2}, Z_{t2})$ represents the obstacle predicted position, the distance between the vehicle predicted position and the obstacle predicted position can be obtained by the following Expression (8). When the distance between the vehicle predicted position and the obstacle predicted position is smaller than or equal to a specified value, it is possible to judge that the possibility of contact is high.

$$\sqrt{(x_{t2}-X_{t2})^2+(y_{t2}-X_{t2})^2} \quad \text{Expression (8)}$$

As illustrated in FIG. 4, the HMI generator 1307 may output the vehicle travel information and the image information to the display 12 as information necessary for operation of the operated vehicle 16. Note that as for one or more obstacles with a high possibility of contacting or colliding with the operated vehicle 16 based on at least the vehicle predicted position 202b and the obstacle predicted positions (203b, 204b, 205b, 206b, 207b, 208b), the HMI generator 1307 may superimpose a frame line or the like for indicating a risk on the corresponding obstacles displayed on the image information. In other words, the HMI generator 1307 may output information for calling attention to the display 12.

Note that the HMI generator 1307 may display a frame line or the like on the entire screen of the display 12 to indicate a risk when it can be judged that the possibility of contact and collision with the operated vehicle 16 is high based on at least the vehicle predicted position 202b and the obstacle predicted positions (203b, 204b, 205b, 206b, 207b, 208b).

[Operation]

Next, operation of the remote operation system 100 in this embodiment will be described.

Figure 5:
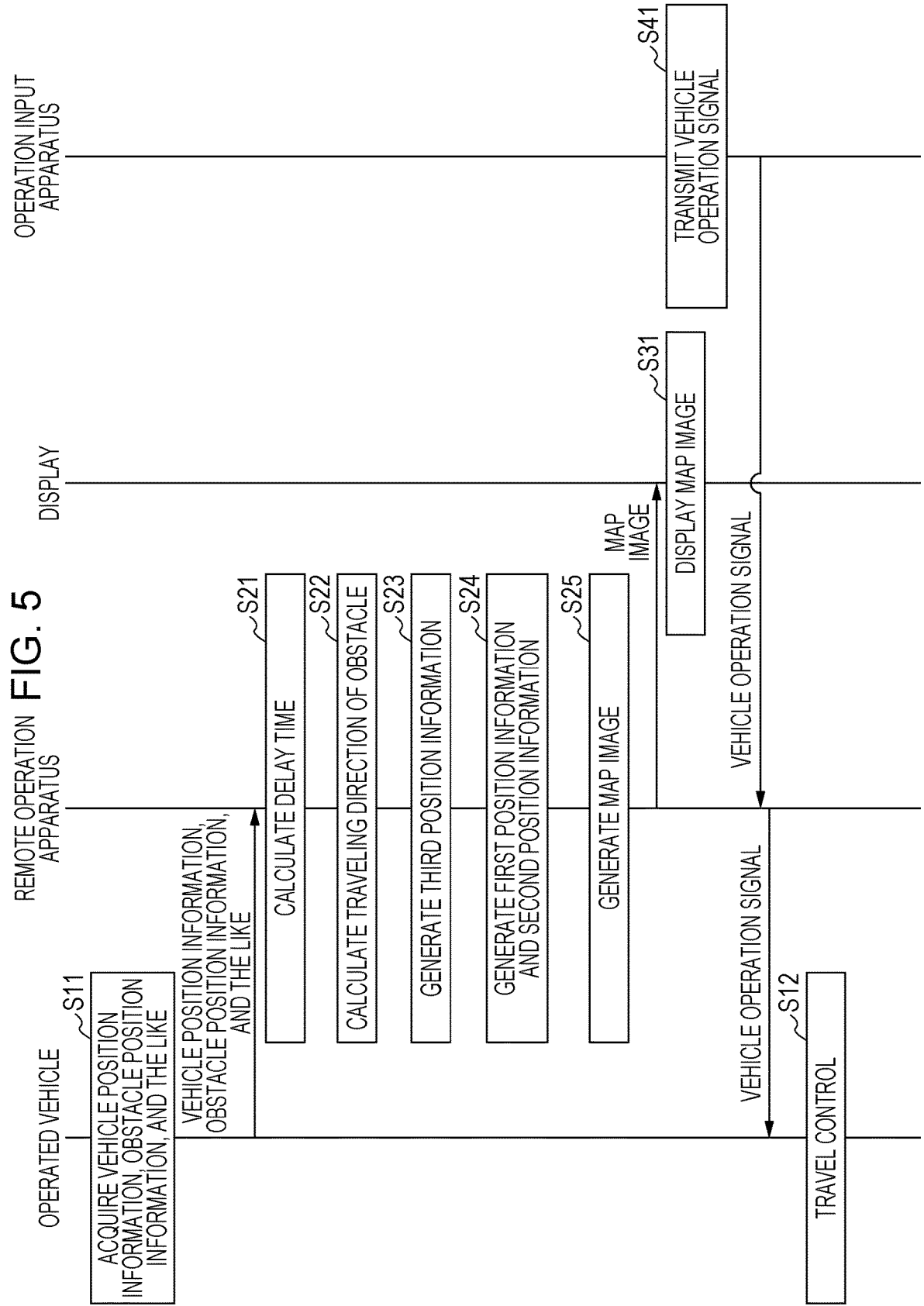
FIG. 5 is a sequence diagram illustrating operation of the remote operation system according to Embodiment 1.

FIG. 5 is a sequence diagram illustrating operation of the remote operation system according to Embodiment 1.

As illustrated in FIG. 5, first, the sensors on the operated vehicle 16 sense the surroundings of the operated vehicle 16 to acquire vehicle position information of the operated vehicle 16, vehicle travel information, obstacle position information, image information, and other information (S11). The operated vehicle 16 transmits the vehicle position information, vehicle travel information, obstacle position information, image information, and other information measured by the sensors to the remote operation apparatus 13 via the radio communication unit 1601 and the like.

Next, the remote operation apparatus 13 acquires the vehicle position information, obstacle position information, and other information. The time measurer calculates the delay time required for the information transmission between the operated vehicle 16 and the remote operation apparatus 13 (S21) and outputs delay information to the HMI generator 1307.

Next, the direction calculator 1307b of the HMI generator 1307 calculates the travelling directions of the obstacles from the current positions of the obstacles based on the obstacle position information (S22). The direction calculator 1307b outputs information indicating the travelling directions of the obstacles to the image generator 1307d.

Next, the position information processor 1307a of the HMI generator 1307 generates third position information indicating a third predicted position which the operated vehicle 16 is predicted to reach after a certain time has passed from the current position of the operated vehicle 16 indicated by the vehicle position information, based on steering angle information and the vehicle position information (S23). The position information processor 1307a outputs the third position information to the image generator 1307d.

Next, the position information processor 1307a of the HMI generator 1307 generates first position information indicating a first predicted position based on the vehicle position information and the delay information (S24). The position information processor 1307a also generates second position information indicating second predicted positions of the obstacles based on the obstacle position information and the delay information (S24). The position information processor 1307a outputs the first position information and the second position information to the image generator 1307d of the HMI generator 1307.

Next, the image generator 1307d maps positions based on the first, second, and third position information and the information indicating the travelling directions of the obstacles, on a map indicated by the map information stored in the map database 1306, and generates a map image (S25). The image generator 1307*d* outputs the map image to the display 12.

Next, the display 12 displays the map image (S31).

Next, when the operator 10 recognizes from the map image displayed on the display 12 that the operated vehicle 16 is at risk of colliding with an obstacle, the operator 10 operates the operation input apparatus 11. The operation input apparatus 11 transmits vehicle operation signal to the remote operation apparatus 13 (S41).

Next, the remote operation apparatus 13 receives the vehicle operation signal and transmits it to the operated vehicle 16.

Next, the operated vehicle 16 receives the vehicle operation signal, and travels in accordance with the vehicle operation signal (S12). In this way, the remote operation system 100 can remotely control the operated vehicle 16 which is travelling on a road.

Next, descriptions will be provided for a mode of contents displayed on the display 12 in accordance with the distance between the operated vehicle 16 and an obstacle.

Figure 6:
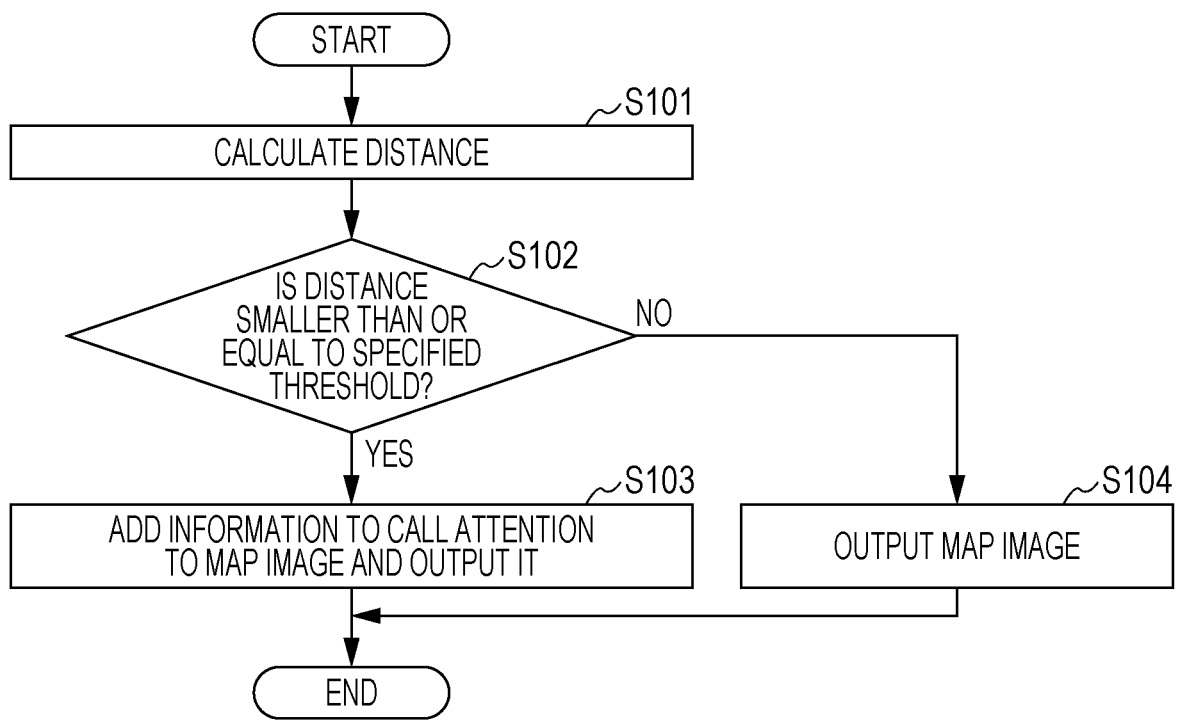
FIG. 6 is a flowchart according to Embodiment 1, illustrating processing to determine information to be displayed in accordance with the distance between the operated vehicle and an obstacle.

FIG. 6 is a flowchart according to Embodiment 1 illustrating processing to determine information to be displayed on the display 12 in accordance with the distance between the operated vehicle 16 and an obstacle.

As illustrated in FIG. 6, first, the judgment processor 1307*c* calculates the distance between the operated vehicle 16 and the obstacle based on the first predicted position and the second predicted position (S101).

Next, the judgment processor 1307*c* judges whether the distance calculated at step S101 is smaller than or equal to a specified threshold (S102).

If the distance between the operated vehicle 16 and the obstacle is smaller than or equal to the specified threshold (YES at S102), the judgment processor 1307*c* adds information to call attention on the corresponding obstacle to the map image of FIG. 4 (S103). Specifically, the judgment processor 1307*c* changes the color of the obstacle, which are illustrated on the map image and close to the operated vehicle 16, as the information to call attention on the corresponding obstacle to make it easy for the operator 10 to recognize that danger is approaching. The judgment processor 1307*c* outputs the map image on which the information to call attention on the corresponding obstacle is added to the display 12 (S103). Then, this processing ends.

If the distance between the operated vehicle 16 and an obstacle is larger than the specified threshold (NO at S102), it is conceivable that the distance between the obstacle and the operated vehicle 16 is large enough, and the judgment processor 1307*c* outputs an ordinary map image to the display 12 (S104). Then, this processing ends.

Next, descriptions will be provided for the case of forcibly stopping the operated vehicle 16.

Figure 7:
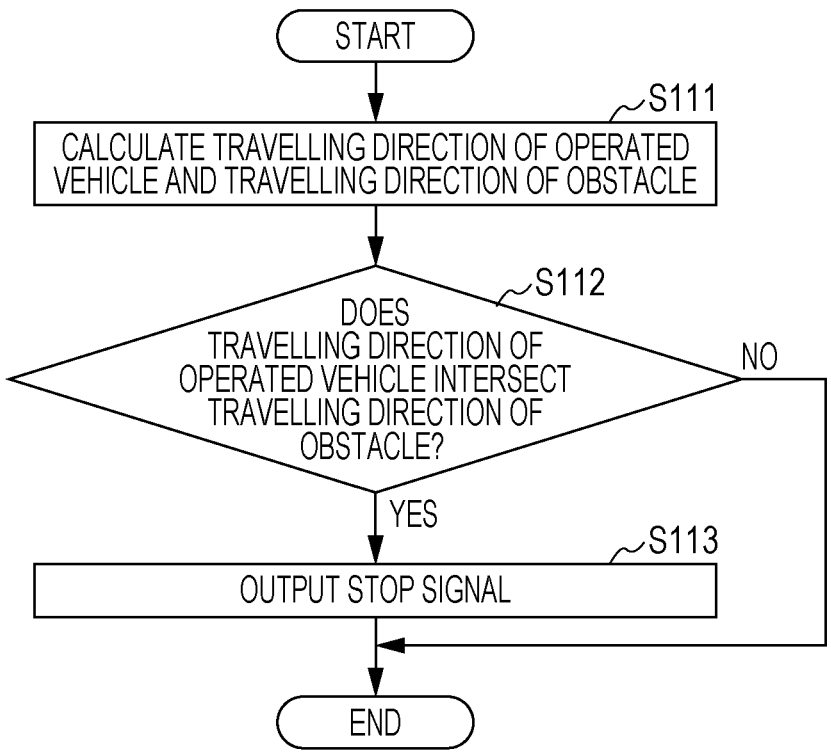
FIG. 7 is a flowchart according to Embodiment 1, illustrating processing to control the travel of the operated vehicle using the travelling direction of the operated vehicle and the travelling direction of an obstacle.

FIG. 7 is a flowchart according to Embodiment 1 illustrating processing to control the travel of the operated vehicle 16, using the travelling direction of the operated vehicle 16 and the travelling direction of an obstacle.

As illustrated in FIG. 7, first, the direction calculator 1307*b* calculates a travelling direction indicating the direction in which the operated vehicle 16 is predicted to move from the current position of the operated vehicle 16 indicated by the vehicle position information, based on the vehicle position information and the first position information. Based on the obstacle position information, the direction calculator 1307*b* calculates a travelling direction indicating the direction in which the obstacle is predicted to move from the current position of the obstacle indicated by the obstacle position information (S111).

Next, the judgment processor 1307*c* judges whether the travelling direction of the operated vehicle 16 intersects the travelling direction of the obstacle based on the travelling direction of the operated vehicle 16 and the travelling direction of the obstacle (S112).

If the travelling direction of the operated vehicle 16 intersects the travelling direction of the obstacle (YES at S112), the judgment processor 1307*c* outputs a stop signal for stopping the travel of the operated vehicle 16 to the operated vehicle 16 (S113). Then, this processing ends.

On the other hand, if the travelling direction of the operated vehicle 16 does not intersect the travelling direction of the obstacle (NO at S112), this processing ends.

An example of the case where the judgment processor 1307*c* outputs information to call attention on the corresponding obstacle to the display 12 will be illustrated.

Figure 8A:
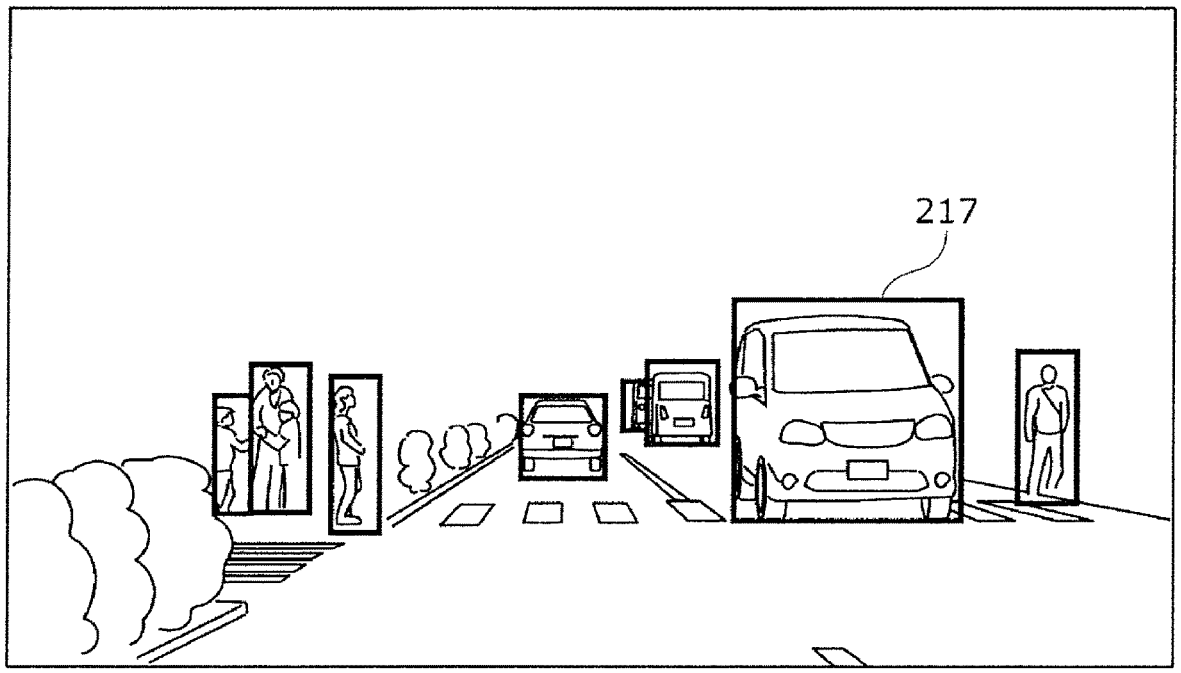
FIG. 8A is a conceptual diagram according to Embodiment 1, illustrating obstacles.
Figure 8B:
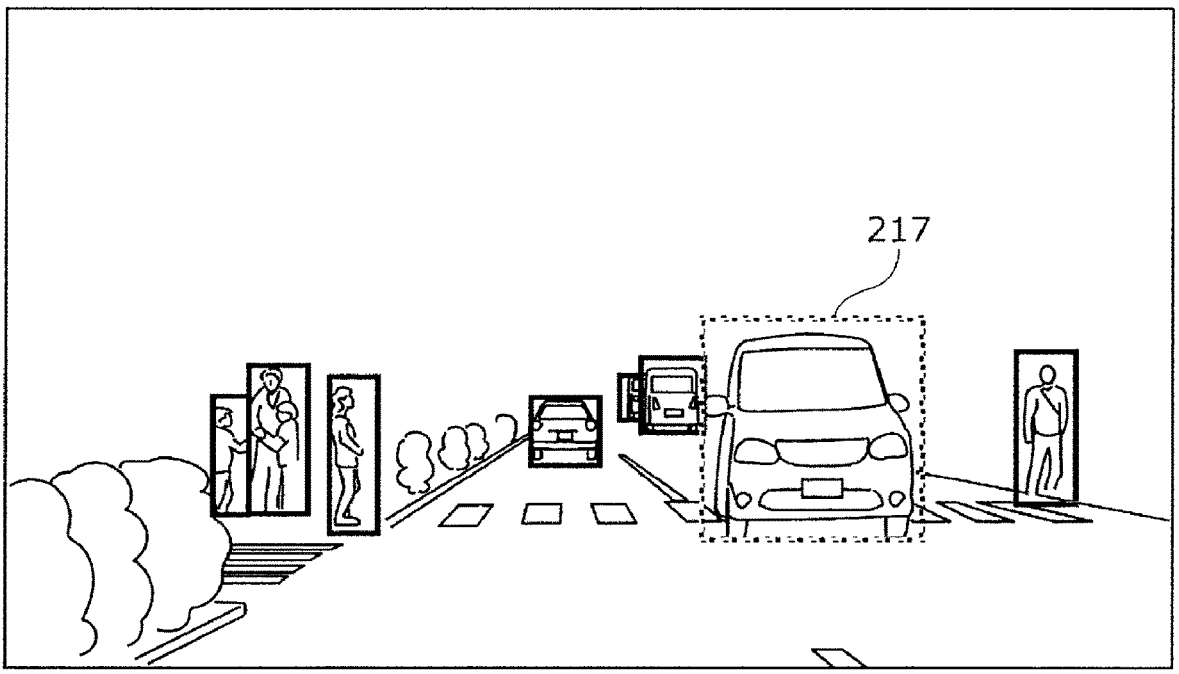
FIG. 8B is a conceptual diagram according to Embodiment 1, illustrating a state where the operated vehicle is at risk of colliding with an obstacle.

FIG. 8A is a conceptual diagram according to Embodiment 1 illustrating obstacles. FIG. 8B is a conceptual diagram according to Embodiment 1 illustrating a state where the operated vehicle 16 is at risk of colliding with an obstacle. FIG. 8B illustrates the obstacles after a certain time has passed since the time of FIG. 8A.

FIGS. 8A and 8B are an output screen displayed on the display 12. The output screen may be displayed at a location adjacent to the output screen 200 of FIG. 4.

In FIG. 8A, each of the obstacles sensed by the operated vehicle 16 is surrounded by a solid rectangular frame. In FIG. 8B illustrating the state after a certain time has passed since the time of FIG. 8A, the travelling direction of an oncoming vehicle 217, which is one of the obstacles in FIG. 8A, is directed toward the operated vehicle 16. In this case, since the oncoming vehicle 217 may turn, the judgment processor 1307*c* judges that the travelling direction of the operated vehicle 16 intersects the travelling direction of the oncoming vehicle 217. In this case, the judgment processor 1307*c*, for example, changes the color of the rectangular frame of the oncoming vehicle 217 to output information to call attention on the obstacle to the display 12. The display 12 displays the oncoming vehicle 217 with the color of the rectangular frame changed.

Next, reduction of the information volume of image information will be described.

FIG. 9 is a flowchart according to Embodiment 1 illustrating processing to reduce the image information.

As illustrated in FIG. 9, first, the remote control unit 1609 acquires the communication rate between the remote operation apparatus 13 and the operated vehicle 16, more specifically, the communication rate between the radio base station 15 and the operated vehicle 16 from the radio communication unit 1601 (S201).

Next, the remote control unit 1609 judges in accordance with the behavior of the operated vehicle 16 whether the communication rate is higher than a specified value (S202).

If the communication rate is lower than or equal to the specified value (NO at S202), the remote control unit 1609 determines an importance level for each camera 1612 (S204).

Next, the remote control unit 1609 reduces the information volume of the image information generated by the cameras 1612 in accordance with the importance levels (S205). The remote control unit 1609 reduces the information volume of image information with a low importance level and does not reduce or reduces a little the information volume of image information with a high importance level, in accordance with the importance levels set at step S204.

The remote control unit 1609 outputs the generated image information to the remote operation apparatus 13 (S205). Then, this processing ends.

On the other hand, if the communication rate is higher than the specified value (YES at S202), the remote control unit 1609 outputs the image information generated by the cameras 1612 to the remote operation apparatus 13 without change (S203). Then, this processing ends.

Note that in this processing, step S204 determines the importance levels, but this step is not an essential constituent. In other words, the information volume of the image information may be reduced without determining the importance levels.

[Operation and Effect]

Next, descriptions will be provided for the operation and effect of the remote operation apparatus 13, operated vehicle 16, information processing method, and program in this embodiment.

As described above, in the remote operation apparatus 13 according to this embodiment, the position information processor 1307*a* generates the first position information indicating the first predicted position of the operated vehicle 16 from the current position of the operated vehicle 16 considering the delay time, and also generates the second position information indicating the second predicted positions of one or more obstacles from the current positions of the obstacles considering the delay time. The position information processor 1307*a* outputs the first position information and the second position information. With this process, even when the delay time required for the information transmission between the operated vehicle 16 and the remote operation apparatus 13 occurs, the first position information of the operated vehicle 16 and the second position information of the obstacles considering the delay time can be presented to the operator 10 at a remote location. As a result, the operator 10 can recognized information on both the vehicle predicted position and the obstacle predicted positions, which makes it easy for the operator 10 to perform remote operation of the operated vehicle 16.

Thus, the safety of the operated vehicle 16 is improved. This allows the operator 10 to safely perform remote operation of the operated vehicle 16.

The information processing method and the program according to this embodiment have the same operation and effect as described above.

In the remote operation apparatus 13 according to this embodiment, the position information processor 1307*a* calculates the third predicted position which the operated vehicle 16 is predicted to reach after a certain time has passed from the current position of the operated vehicle 16 based on the vehicle position information. The position information processor 1307*a* outputs the third position information indicating the third predicted position to the display 12. This makes it possible to present to the operator 10 the current position of the operated vehicle 16 and the third predicted position indicating the position after a certain time has passed from the current position. This makes it easy to remotely operate the operated vehicle 16. This allows the operator 10 to make correction or the like on operation of the operated vehicle 16, and thus more safely operates the operated vehicle 16.

In addition, in the remote operation apparatus 13 according to this embodiment, the direction calculator 1307*b* calculates the travelling direction of each obstacle in which the obstacle is predicted to move from the current position of the obstacle indicated by the obstacle position information, based on the obstacle position information. The direction calculator 1307*b* outputs the direction information indicating the travelling direction. This makes it possible to present to the operator 10 the current positions and the travelling directions of the obstacles around the operated vehicle 16. This allows the operator 10 to quickly distinguish the obstacles to be paid attention when operating the operated vehicle 16. This allows the operator 10 to easily recognize the states of the operated vehicle 16 and obstacles, and thus to more safely operate the operated vehicle 16.

In addition, in the remote operation apparatus 13 according to this embodiment, when the distance between the operated vehicle 16 and an obstacle is smaller than or equal to a specified threshold, the judgment processor 1307*c* outputs information to call attention on the corresponding obstacle as the states of the operated vehicle 16 and the obstacle. This makes it possible to present to the operator 10 in advance, a risk of occurrence of an accident such as collision between the operated vehicle 16 and the obstacle. This allows the operator 10 to easily recognize the states of the operated vehicle 16 and the obstacle from the information to call attention, and thus to more safely operate the operated vehicle 16.

In addition, in the remote operation apparatus 13 according to this embodiment, when the distance between the operated vehicle 16 and an obstacle is smaller than or equal to a specified threshold, the judgment processor 1307*c* outputs information to call attention on the corresponding obstacle in a form of an alarm sound. This allows the operator 10 to recognize in advance, a risk of occurrence of an accident such as collision between the operated vehicle 16 and the obstacle. This allows the operator 10 to more safely operate the operated vehicle 16.

In addition, in the remote operation apparatus 13 according to this embodiment, the direction calculator 1307*b* calculates the travelling direction indicating the direction in which the operated vehicle 16 is predicted to move from the current position of the operated vehicle 16 indicated by the vehicle position information, based on the vehicle position information and the first position information. If the travelling direction of the operated vehicle 16 intersects the travelling direction of an obstacle, the judgment processor 1307*c* outputs a stop signal for stopping the travel of the operated vehicle 16 to the operated vehicle 16. This makes it possible to stop the travel of the operated vehicle 16 without presenting to the operator 10 a risk of occurrence of an accident such as collision between the operated vehicle 16 and the obstacle. Since no delay time due to judgment of the operator 10 occurs in this process, the safety of the operated vehicle 16 is improved.

In addition, in the remote operation apparatus 13 according to this embodiment, it is possible to present the first predicted position of the operated vehicle 16 considering the delay time caused by data processing and the second predicted positions of the obstacles around the operated vehicle 16 to the operator 10 at a remote location who is operating the operated vehicle 16, in addition to the delay time required for the information transmission between the operated vehicle 16 and the remote operation apparatus 13. Consequently, the operability of the operated vehicle 16 is improved. This allows the operator 10 to more safely operate the operated vehicle 16.

In addition, in the operated vehicle 16 according to this embodiment, the remote control unit 1609 is capable of control the information volume of the vehicle travel information to be transmitted by the operated vehicle 16, the priority of the vehicle travel information, and the like, in accordance with the communication quality between the operated vehicle 16 and the remote operation apparatus 13 and the delay time required for the information transmission between the operated vehicle 16 and the remote operation apparatus 13. This allows the operated vehicle 16 to transmit necessary information related to the safety in remotely operating the operated vehicle 16 on a high priority basis even when the possible communication rate decreases between the operated vehicle 16 and the remote operation apparatus 13.

In addition, when the communication rate is lower than or equal to a specified value, the operated vehicle 16 according to this embodiment reduces the information volume of the image information which the remote control unit 1609 acquired from the cameras 1612. This makes it easy to maintain transmission and reception of information in real time between the operated vehicle 16 and the remote operation apparatus 13.

In addition, in the operated vehicle 16 according to this embodiment, the remote control unit 1609 reduces the information volume of the image information generated by the cameras 1612 in accordance with the importance levels. For example, when the operated vehicle 16 turns, the image information captured by a camera 1612 that captures the turning direction becomes important, and the importance levels of images captured by the other cameras 1612 decrease. Since the image information captured by the camera 1612 that captures the turning direction has a high importance level, the information volume of this image information is not reduced at all or reduced little. Reducing the information volume of image information with a low importance level in this way makes it easy to maintain transmission and reception of information in real time between the operated vehicle 16 and the remote operation apparatus 13. In addition, it is possible to obtain a clear image for image information with a high importance level.

Modification of Embodiment 1

Next, a remote operation system according to this modification will be described.

This modification is different from Embodiment 1 in that the configuration of the operated vehicle 160 further includes a position detection unit 1614 and an obstacle detection unit 1615. Unless otherwise specified, this modification is the same as Embodiment 1, so that the same constituents are denoted by the same symbols, and detailed descriptions thereof will be omitted.
[Configuration of Another Operated Vehicle]

Figure 10:
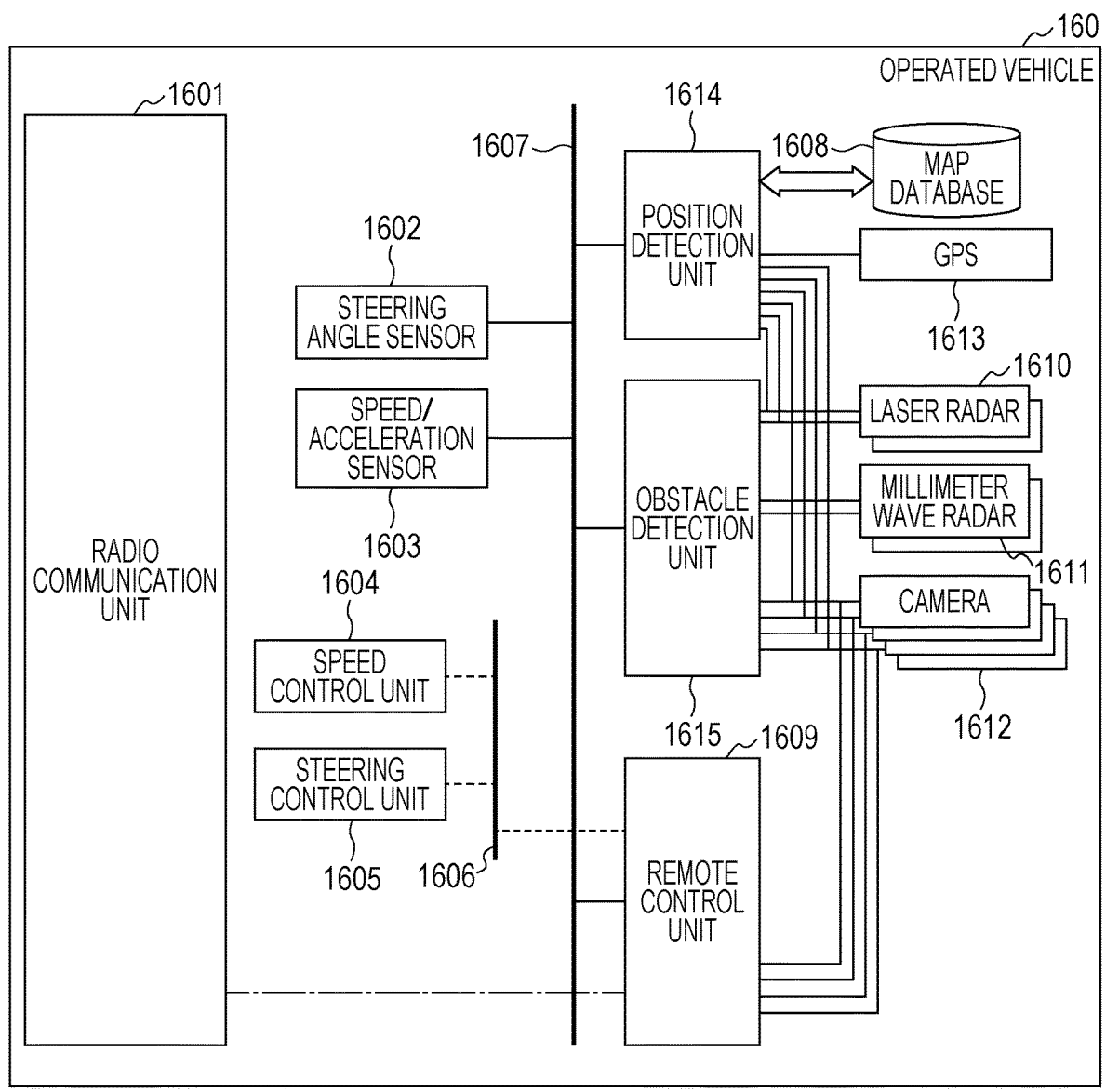
FIG. 10 is a block diagram illustrating another example of the configuration of an operated vehicle in a remote operation system according to a modification of Embodiment 1.

FIG. 10 is a block diagram illustrating an example of another configuration of an operated vehicle 160 according to the modification of Embodiment 1.

As illustrated in FIG. 10, the configuration of the operated vehicle 160 further includes the position detection unit 1614 and the obstacle detection unit 1615. In the operated vehicle 160 of FIG. 10, of the roles of the remote control unit 1609 of FIG. 2, the generation of the vehicle position information is performed by the position detection unit 1614, and the generation of the obstacle position information is performed by the obstacle detection unit 1615.

The position detection unit 1614, instead of a remote control unit 1609, measures the current position of the operated vehicle 160 based on one or more pieces of information acquired from a steering angle sensor 1602, a speed/acceleration sensor 1603, a map database 1608, laser radars 1610, cameras 1612, and a GPS 1613, and generates vehicle position information.

The obstacle detection unit 1615, instead of the remote control unit 1609, generates obstacle position information based on information obtained from the laser radars 1610, millimeter wave radars 1611, and the cameras 1612.

The remote control unit 1609 generates image information of the front, rear, right, and left directions of the operated vehicle 160 obtained from the one or more cameras 1612, and also generates vehicle travel information from information outputted by the steering angle sensor 1602 and the speed/acceleration sensor 1603.

The remote control unit 1609 transmits the vehicle position information, vehicle travel information, and image information generated by the position detection unit 1614, and the obstacle position information generated by the obstacle detection unit 1615 to a remote operation apparatus 130 via a radio communication unit 1601.

Figure 11:
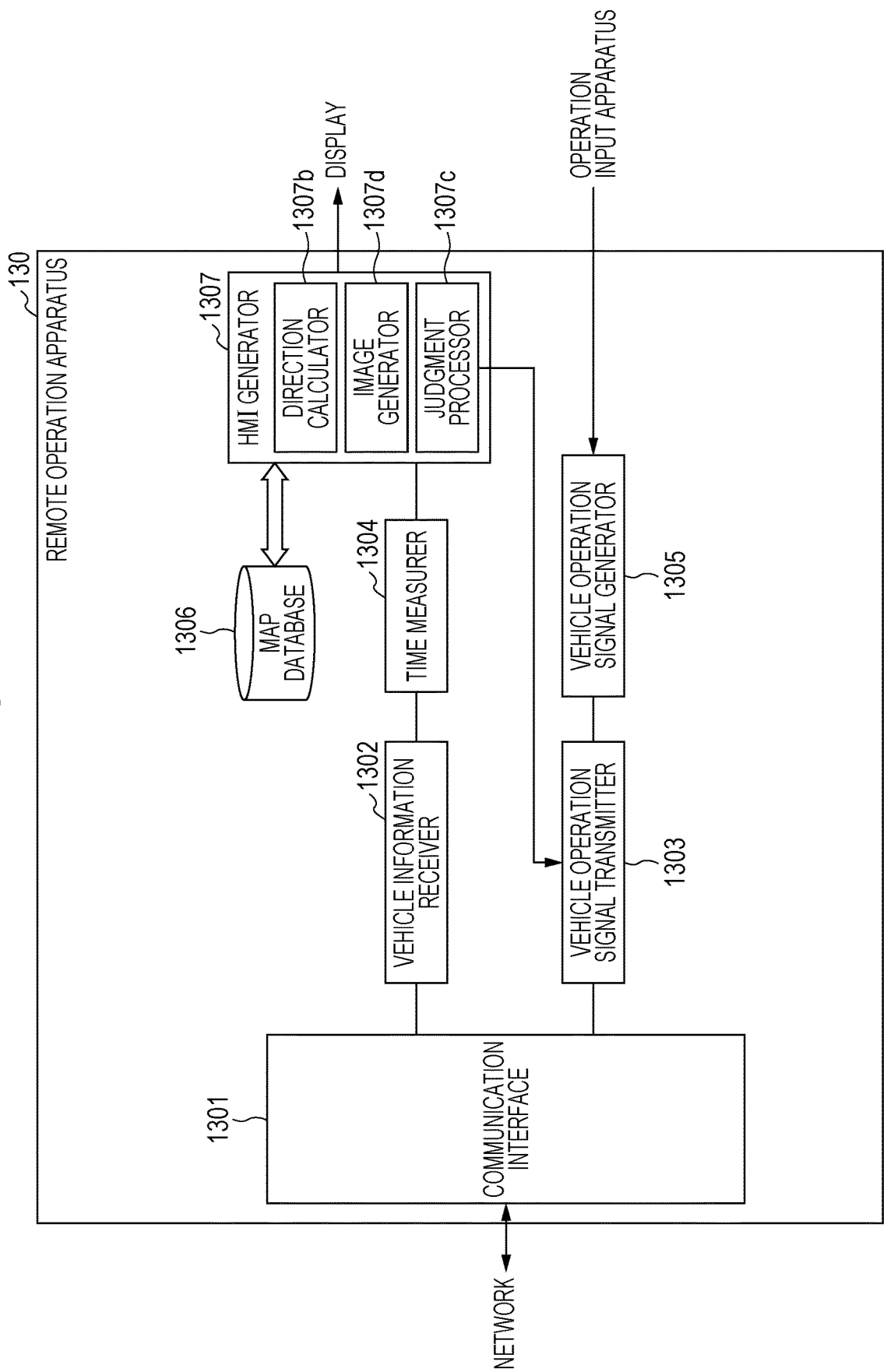
FIG. 11 is a block diagram illustrating an example of another configuration of an operated vehicle in the modification of Embodiment 1.

FIG. 11 is a block diagram illustrating an example of another configuration of the remote operation apparatus 130 in the modification of Embodiment 1.

In this modification, the vehicle position information is generated by the position detection unit 1614 of the operated vehicle 160, and the obstacle position information is generated by the obstacle detection unit 1615 of the operated vehicle 160. Thus, the difference from FIG. 3 illustrating Embodiment 1 is that an HMI generator 1307 does not have the position information processor 1307a.

The operation and effect of this modification is the same as those of Embodiment 1 and the like, and detailed description of the same operation and effect will be omitted.

Embodiment 2

Next, a remote operation system of this embodiment will be described.

This embodiment is different from Embodiment 1 and the like in that the time measurer 1304 in FIG. 3 is not provided in a remote operation apparatus 230 and a remote control unit 1609 generates delay information, and in some other points.

Other constituents in a remote operation system in this embodiment are the same as those of the remote operation system 100 of Embodiment 1. Thus, unless otherwise specified, the same constituents are denoted by the same symbols, and detailed descriptions of the constituents will be omitted.
[Configuration of Operated Vehicle]

As illustrated in FIG. 2, the remote control unit 1609 measures delay time required for the information transmission between an operated vehicle 16 and the remote operation apparatus 230 including a radio base station 15 and a network 14.

Note that the remote control unit 1609 may calculate the current position and a first predicted position of the operated vehicle 16 based on vehicle position information and the delay time. In addition, the remote control unit 1609 may calculate the current positions and second predicted positions of obstacles based on obstacle position information and the delay time. Then, the remote control unit 1609 may transmit the vehicle position information, first position information, vehicle travel information, obstacle position information, second position information, and image information to the remote operation apparatus 230 via a radio communication unit 1601.

The remote control unit 1609 receives vehicle operation signal transmitted by the remote operation apparatus 230 via the radio communication unit 1601. The remote control unit 1609 controls the travel of the operated vehicle 16 using a speed control unit 1604 and a steering control unit 1605 in accordance with the vehicle operation signal.

[Configuration of Remote Operation Apparatus]

The remote operation apparatus 230 in this embodiment will be described using FIG. 12.

Figure 12:
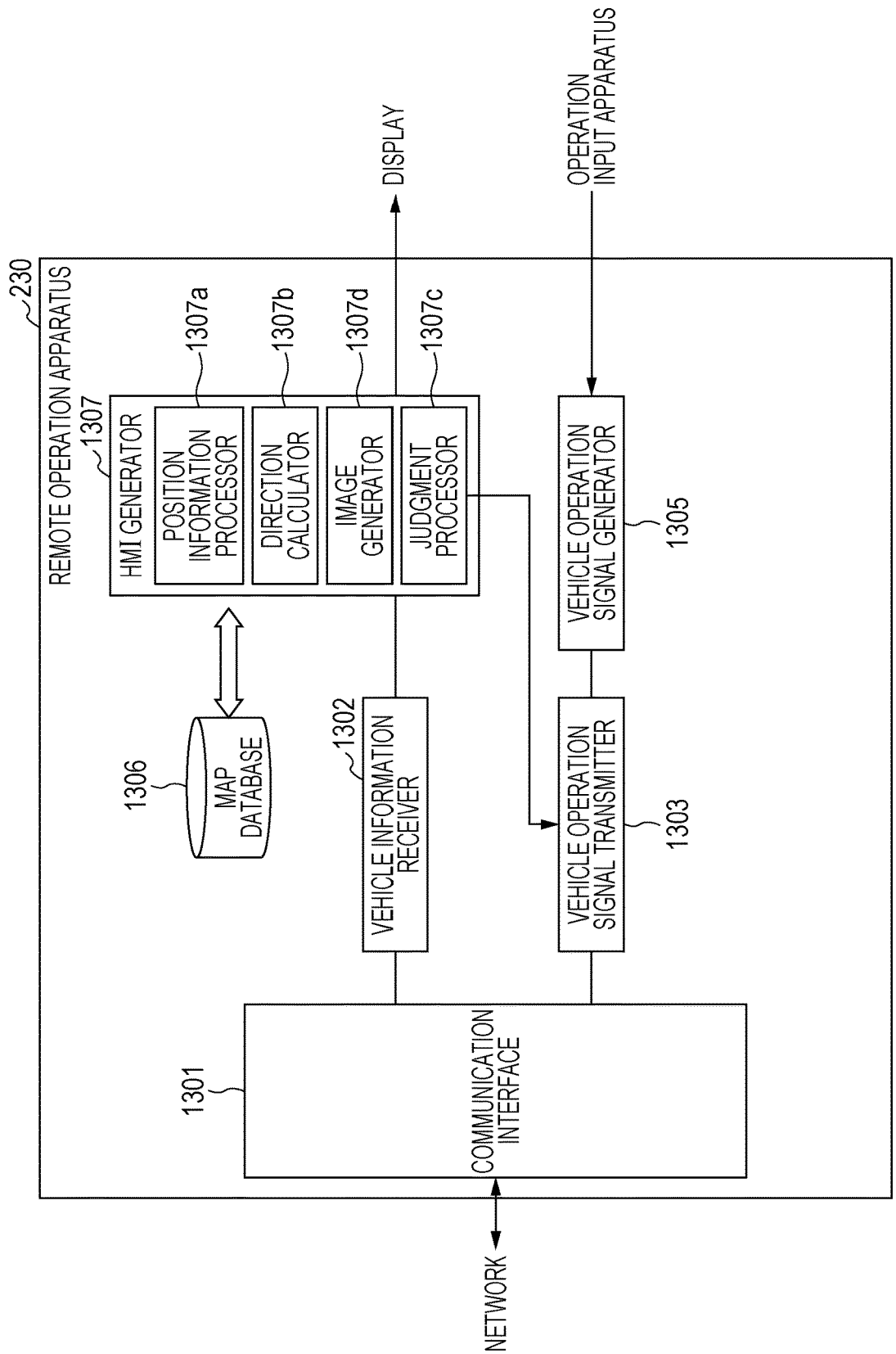
FIG. 12 is a block diagram illustrating an example of the configuration of a remote operation apparatus in a remote operation system according to Embodiment 2.

FIG. 12 is a block diagram illustrating an example of the configuration of the remote operation apparatus 230 in the remote operation system according to Embodiment 2.

As illustrated in FIG. 12, the remote operation apparatus 230 includes a communication interface 1301, vehicle information receiver 1302, vehicle operation signal transmitter 1303, vehicle operation signal generator 1305, map database 1306, and HMI generator 1307.

The communication interface 1301 is connected to a network 14 and communicates with the operated vehicle 16 via the network 14 and a radio base station 15.

The vehicle information receiver 1302 receives the delay information, vehicle position information, vehicle travel information, obstacle position information, and image information transmitted by the operated vehicle 16, via the communication interface 1301. Note that in the case where the remote control unit 1609 generates the first position information and the second position information, the vehicle information receiver 1302 may further receive the first position information and second position information transmitted by the operated vehicle 16, via the communication interface 1301.

The vehicle operation signal generator 1305 generates the vehicle operation signal based on the operation of an operation input apparatus 11 by an operator 10.

The vehicle operation signal transmitter 1303 transmits the vehicle operation signal generated by the vehicle operation signal generator 1305 to the operated vehicle 16 via the communication interface 1301, network 14, and radio base station 15.

The HMI generator 1307 generates a map image necessary for the operator 10 to operate the operated vehicle 16 based on the vehicle current position, first position information, vehicle travel information, obstacle position information, second position information, image information, and map information, and outputs the map image to a display 12.

In this embodiment, since the remote control unit 1609 measures the delay time required for the information transmission between the operated vehicle 16 and the remote operation apparatus 230 including the radio base station 15 and the network 14, the remote operation apparatus 230 does not need to have a time measurer 1304. This reduces the manufacturing cost of the remote operation apparatus 230 by the amount corresponding to the time measurer 1304, which is not provided to this remote operation system.

The operation and effect in this embodiment is the same as those in Embodiment 1 and the like, and detailed descriptions of the same operation and effect will be omitted.

(Modification and Others)

Although the present disclosure has been described based on Embodiments 1 and 2, and the modification of Embodiment 1, as described above, the present disclosure is not limited to Embodiments 1 and 2, and the modification of Embodiment 1, described above.

For example, the information processing apparatuses and the operated vehicles according to Embodiments 1 and 2 and the modification of Embodiment 1 may use one or more of changing the color of the obstacle illustrated in the map image, which is close to the operated vehicle; flashing the obstacle illustrated in the map image, which is close to the operated vehicle; and outputting an alarm sound with a speaker, as the information to call attention on the obstacle. In other words, changing the color of an obstacle, flashing the obstacle, or the speaker are not essential constituents for the information processing apparatus.

In addition, in the information processing apparatuses and the operated vehicles according to above Embodiments 1 and 2, the position information processor 1307a does not need to generate the third position information, and generating the third position information is not an essential constituent. In other words, the third predicted position does not need to be displayed on the display screen.

In addition, the information processing apparatus according to above Embodiment 1 may be mounted on the operated vehicle. In this case, the information processing apparatus transmits the map image and other information to the display via the radio base station and the network.

In addition, in the information apparatuses and the operated vehicles in above Embodiments 1 and 2, and the modification of Embodiment 1, if the radio wave intensity between the information processing apparatus and the operated vehicle becomes lower than a threshold, the information processing apparatus may transmit a stop signal for stopping the travel of the operated vehicle to the operated vehicle. This causes the operated vehicle to stop its travel.

In addition, each of the processors in the information processing apparatuses and the operated vehicles according to Embodiments 1 and 2, and the modification of Embodiment 1 is typically implemented as an LSI, which is an integrated circuit. These may be separate one-chips, or alternatively, some or all of them may be formed into a one-chip.

In addition, the integrated circuit is not limited to an LSI, and the integrated circuit may be implemented as a dedicated circuit or a general purpose processor. It is also possible to utilize an FPGA (Field Programmable Gate Array) which can be programmed after manufacturing the LSI, or a reconfigurable processor in which connections and settings of circuit cells in the LSI can be reconfigured.

Note that in Embodiments 1 and 2, and the modification of Embodiment 1, each constituent may be configured with dedicated hardware or may be implemented by executing a software program suitable for the constituent. Each constituent may be implemented by a program execution unit, such as a CPU or a processor, reading out and executing a software program recorded in a recording medium, such as a hard disk or a semiconductor memory.

In addition, all the numerals used above are examples for explaining the present disclosure specifically, and the embodiments of the present disclosure are not limited to the numerals used as the examples.

In addition, the division of the functional blocks in the block diagram is an example. Multiple functional blocks may be implemented as one functional block, one functional block may be divided into multiple functional blocks, and some functions in a functional block may be moved to another functional block. In addition, functions of function blocks having similar functions may be processed in parallel or in a time-division manner by a single piece of hardware or software.

In addition, the order in which the steps in the flowcharts are executed is an example for explaining the present disclosure concretely and may be in an order other than the above. Some of the above steps may be executed simultaneously (in parallel) with other steps.

Besides the above, the present disclosure includes modes obtained by applying various modifications, which occur to those skilled in the art, to Embodiments 1 and 2 and the modification of Embodiment 1 described above and modes implemented by arbitrarily combining constituents and functions in Embodiments 1 and 2 and the modification of Embodiment 1 without departing from the spirit of the present disclosure.

The information processing apparatus, operated vehicle, information processing method, and program according to the present disclosure are effective for systems in which an operator at a remote location remotely operates a vehicle traveling on a road utilizing a communication line and the like.

What is claimed is:

1. An information processing apparatus for an operator remotely operating an operated vehicle, the information processing apparatus comprising:
    at least one of a processor or a circuit; and
    a memory including at least one set of instructions that, when executed by the at least one of the processor or the circuit, cause the at least one of the processor or the circuit to perform operations including:
        measuring a delay time for information transmission and processing between and by the operated vehicle and the information processing apparatus, the delay time being from when sensors of the vehicle sense the operated vehicle and obstacles to when predicted positions of the operated vehicle and the obstacles are output;
        based on vehicle position information indicating a current position of the operated vehicle acquired by the operated vehicle and delay information indicating the delay time, generating first position information indicating a first predicted position of the operated vehicle from the current position of the operated vehicle considering the delay time;
        based on obstacle position information indicating a current position of at least one obstacle around the operated vehicle acquired by the operated vehicle and the delay information, generating second position information indicating a second predicted position of the obstacle from the current position of the obstacle considering the delay time;
        based on the vehicle position information, calculating a third predicted position which is different from the first predicted position and which the operated vehicle is predicted to reach after a certain time has passed from the current position of the operated vehicle; and
        outputting the first position information, the second position information, and third position information, the third position information indicating the calculated third predicted position.

2. The information processing apparatus according to claim 1, wherein the operations further include:
    based on the obstacle position information, calculating a travelling direction in which the obstacle is predicted to move from the current position of the obstacle indicated by the obstacle position information; and
    outputting direction information indicating the calculated travelling direction of the obstacle.

3. The information processing apparatus according to claim 1, wherein the operations further include:
    based on at least the first predicted position and the second predicted position, judging whether a distance between the operated vehicle and the obstacle is smaller than or equal to a specified threshold; and
    outputting information to call attention to the obstacle when the distance between the operated vehicle and the obstacle is smaller than or equal to the specified threshold.

4. The information processing apparatus according to claim 3, wherein the operations further include:
    outputting the information to call attention to the obstacle in a form of an alarm sound when the distance between the operated vehicle and the obstacle is smaller than or equal to the specified threshold.

5. The information processing apparatus according to claim 2, wherein the operations further include:
    based on the vehicle position information and the first position information, calculating a travelling direction in which the operated vehicle is predicted to move from the current position of the operated vehicle indicated by the vehicle position information;
    based on the travelling direction of the operated vehicle and the travelling direction of the obstacle, judging whether the travelling direction of the operated vehicle intersects the travelling direction of the obstacle; and
    outputting a stop signal for stopping the operated vehicle to the operated vehicle when the travelling direction of the operated vehicle intersects the travelling direction of the obstacle.

6. The information processing apparatus according to claim 1, wherein the operations further include:
    measuring second delay information indicating a second delay time obtained by combining the delay time with a delay time from when the information processing apparatus generates a vehicle operation signal to operate the operated vehicle to when the operated vehicle receives the vehicle operation signal; and
    outputting the second delay information.

7. An information processing method for an operator remotely operating an operated vehicle, the information processing method comprising:
    measuring a delay time for information transmission and processing between and by the operated vehicle and the information processing apparatus, the delay time being from when sensors of the vehicle sense the operated vehicle and obstacles to when predicted positions of the operated vehicle and the obstacles are output;
    based on vehicle position information indicating a current position of the operated vehicle acquired by the operated vehicle and delay information indicating the delay time, generating first position information indicating a first predicted position of the operated vehicle from the current position of the operated vehicle considering the delay time;
    based on obstacle position information indicating a current position of at least one obstacle around the operated vehicle acquired by the operated vehicle and the delay information, generating second position information indicating a second predicted position of the obstacle from the current position of the obstacle considering the delay time;
    based on the vehicle position information, calculating a third predicted position which is different from the first predicted position and which the operated vehicle is predicted to reach after a certain time has passed from the current position of the operated vehicle; and
    outputting the first position information, the second position information, and third position information, the third position information indicating the calculated third predicted position.

8. A non-transitory computer-readable recording medium storing a program which, when executed by a computer, causes the computer to perform an information processing method for an operator remotely operating an operated vehicle, the information processing method comprising:
- measuring a delay time for information transmission and processing between and by the operated vehicle and the information processing apparatus, the delay time being from when sensors of the vehicle sense the operated vehicle and obstacles to when predicted positions of the operated vehicle and the obstacles are output;
- based on vehicle position information indicating a current position of the operated vehicle acquired by the operated vehicle and delay information indicating the delay time, generating first position information indicating a first predicted position of the operated vehicle from the current position of the operated vehicle considering the delay time;
- based on obstacle position information indicating a current position of at least one obstacle around the operated vehicle acquired by the operated vehicle and the delay information, generating second position information indicating a second predicted position of the obstacle from the current position of the obstacle considering the delay time
- based on the vehicle position information, calculating a third predicted position which is different from the first predicted position and which the operated vehicle is predicted to reach after a certain time has passed from the current position of the operated vehicle; and
- outputting the first position information, the second position information, and third position information, the third position information indicating the calculated third predicted position.

9. The information processing apparatus according to claim 1, wherein the operations further include:
- when a radio wave intensity for information transmission between the information processing apparatus and the operated vehicle is lower than a predetermined threshold, transmitting a stop signal for stopping travelling of the operated vehicle to the operated vehicle.

10. The information processing apparatus according to claim 1, wherein the calculated third predicted position is after the first predicted position in time, with the certain time being longer than the delay time.

11. The information processing apparatus according to claim 1, wherein the calculated third predicted position is before the first predicted position in time, with the certain time being shorter than the delay time.

* * * * *